(12) United States Patent
Bebak et al.

(10) Patent No.: US 11,675,345 B2
(45) Date of Patent: Jun. 13, 2023

(54) CLOUD-BASED MULTI-CAMERA QUALITY ASSURANCE ARCHITECTURE

(71) Applicant: Elementary Robotics, Inc., South Pasadena, CA (US)

(72) Inventors: Kyle Bebak, Mexico City (MX); Eduardo Mancera, Mexico City (MX); Milind Karnik, Mission Viejo, CA (US); Arye Barnehama, Pasadena, CA (US); Daniel Pipe-Mazo, Redondo Beach, CA (US)

(73) Assignee: Elementary Robotics, Inc., South Pasadena, CA (US)

( * ) Notice: Subject to any disclaimer, the term of this patent is extended or adjusted under 35 U.S.C. 154(b) by 0 days.

(21) Appl. No.: 17/523,846

(22) Filed: Nov. 10, 2021

(65) Prior Publication Data
US 2023/0142117 A1    May 11, 2023

(51) Int. Cl.
*G05B 19/418* (2006.01)
*G06N 20/00* (2019.01)
(Continued)

(52) U.S. Cl.
CPC . *G05B 19/41875* (2013.01); *G05B 19/41815* (2013.01); *G05B 19/41855* (2013.01);
(Continued)

(58) Field of Classification Search
CPC ........ G05B 19/41815; G05B 19/41855; G05B 19/41875; G06V 10/25; G06V 30/10;
(Continued)

(56) References Cited

U.S. PATENT DOCUMENTS

| 6,842,656 B1 * | 1/2005 | Burkhardt | ............... B21B 37/00 700/110 |
| 7,167,583 B1 | 1/2007 | Lipson et al. | |

(Continued)

FOREIGN PATENT DOCUMENTS

| CN | 110823917 A | 2/2020 |
| CN | 111134047 A | 5/2020 |

(Continued)

OTHER PUBLICATIONS

Agrawal, Harsh, CloudCV: deep learning and computer vision on the cloud. Diss. Virginia Tech, 2016.
(Continued)

*Primary Examiner* — Daniel G Mariam
(74) *Attorney, Agent, or Firm* — Jones Day

(57) ABSTRACT

Data is received that is derived from each of a plurality of inspection camera modules forming part of a quality assurance inspection system. The data includes a feed of images of a plurality of objects passing in front of the respective inspection camera module. Thereafter, the received data is separately analyzed by each inspection camera module using at least one image analysis inspection tool. The results of the analyzing can be correlated for each inspection camera module on an object-by-object basis. The correlating can use timestamps for the images and/or detected unique identifiers within the images and can be performed by a cloud-based server and/or a local edge computer. Access to the correlated results can be provided to a consuming application or process.

29 Claims, 29 Drawing Sheets

(51) Int. Cl.
*G06T 7/00* (2017.01)
*G06V 10/25* (2022.01)
*G06V 30/148* (2022.01)
*G06V 30/10* (2022.01)

(52) U.S. Cl.
CPC ........... *G06N 20/00* (2019.01); *G06T 7/0008* (2013.01); *G06V 10/25* (2022.01); *G06V 30/153* (2022.01); *G06T 2207/20081* (2013.01); *G06V 30/10* (2022.01)

(58) Field of Classification Search
CPC .... G06V 30/153; G06N 20/00; G06T 7/0008; G06T 2207/20081
See application file for complete search history.

(56) References Cited

U.S. PATENT DOCUMENTS

| | | | |
|---|---|---|---|
| 7,355,690 B2 * | 4/2008 | Elyasaf | G01N 21/8851 |
| | | | 356/237.2 |
| 8,045,145 B1 | 10/2011 | Bakker et al. | |
| 8,805,745 B1 | 8/2014 | Huebner et al. | |
| 9,824,298 B1 | 11/2017 | Krishnan Gorumkonda | |
| 9,898,812 B1 | 2/2018 | Padfield | |
| 10,062,173 B1 | 8/2018 | Padfield | |
| 10,217,307 B2 | 2/2019 | Phillips et al. | |
| 10,481,597 B2 * | 11/2019 | Oostendorp | G05B 19/41875 |
| 10,776,911 B2 | 9/2020 | Tamai | |
| 10,832,149 B2 | 11/2020 | Mudie et al. | |
| 10,957,041 B2 | 3/2021 | Yip et al. | |
| 10,969,237 B1 | 4/2021 | Zhang et al. | |
| 10,970,621 B1 | 4/2021 | Pichara et al. | |
| 10,984,378 B1 | 4/2021 | Eckman et al. | |
| 11,232,554 B1 | 1/2022 | Do et al. | |
| 11,238,340 B1 * | 2/2022 | Anderson | G02B 27/0093 |
| 2002/0070860 A1 | 6/2002 | Wuestefeld et al. | |
| 2005/0278049 A1 | 12/2005 | Van Den Nieuwelaar et al. | |
| 2006/0092274 A1 | 5/2006 | Good et al. | |
| 2006/0125920 A1 * | 6/2006 | Criminisi | G06T 7/593 |
| | | | 348/E5.015 |
| 2006/0181700 A1 | 8/2006 | Andrews et al. | |
| 2007/0189333 A1 | 8/2007 | Naaman et al. | |
| 2012/0194846 A1 | 8/2012 | Adachi et al. | |
| 2013/0170734 A1 | 7/2013 | Uchiyama | |
| 2013/0177232 A1 | 7/2013 | Hirano | |
| 2013/0332323 A1 | 12/2013 | Phillips et al. | |
| 2014/0050387 A1 | 2/2014 | Zadeh | |
| 2015/0324965 A1 | 11/2015 | Kulkarni | |
| 2016/0034809 A1 | 2/2016 | Trenholm et al. | |
| 2017/0134619 A1 | 5/2017 | Narayanswamy et al. | |
| 2017/0206428 A1 * | 7/2017 | Weiss | G06F 3/04845 |
| 2018/0113083 A1 | 4/2018 | Van Dael et al. | |
| 2018/0144168 A1 | 5/2018 | Schöpflin | |
| 2018/0211373 A1 | 7/2018 | Stoppa et al. | |
| 2018/0238164 A1 | 8/2018 | Jamison et al. | |
| 2018/0252519 A1 | 9/2018 | Fay et al. | |
| 2018/0268256 A1 | 9/2018 | Di Febbo et al. | |
| 2018/0268348 A1 | 9/2018 | Guan | |
| 2018/0302611 A1 | 10/2018 | Baak et al. | |
| 2018/0322337 A1 * | 11/2018 | Marty | G06T 7/20 |
| 2018/0322623 A1 | 11/2018 | Memo et al. | |
| 2018/0365822 A1 | 12/2018 | Nipe et al. | |
| 2018/0376067 A1 | 12/2018 | Martineau | |
| 2019/0035104 A1 * | 1/2019 | Cuban | G06V 10/44 |
| 2019/0073557 A1 | 3/2019 | Matsuda et al. | |
| 2019/0073785 A1 | 3/2019 | Hafner et al. | |
| 2019/0087772 A1 | 3/2019 | Medina et al. | |
| 2019/0126487 A1 | 5/2019 | Benaim et al. | |
| 2019/0287237 A1 | 9/2019 | de Bonfim Gripp et al. | |
| 2019/0295246 A1 | 9/2019 | Smith et al. | |
| 2019/0304079 A1 | 10/2019 | Min et al. | |
| 2019/0318484 A1 | 10/2019 | Dougherty et al. | |
| 2019/0361118 A1 * | 11/2019 | Murad | G01S 17/931 |
| 2020/0005422 A1 | 1/2020 | Subramanian et al. | |
| 2020/0013156 A1 | 1/2020 | Weiss et al. | |
| 2020/0134800 A1 | 4/2020 | Hu et al. | |
| 2020/0151538 A1 | 5/2020 | Sha et al. | |
| 2020/0258223 A1 | 8/2020 | Yip et al. | |
| 2020/0364906 A1 | 11/2020 | Shimodaira | |
| 2020/0394812 A1 | 12/2020 | Carey et al. | |
| 2020/0400586 A1 | 12/2020 | Reynaud et al. | |
| 2020/0413011 A1 | 12/2020 | Zass et al. | |
| 2021/0056681 A1 * | 2/2021 | Hyatt | G05B 19/41875 |
| 2021/0093973 A1 | 4/2021 | Edridge et al. | |
| 2021/0174486 A1 | 6/2021 | Chowhan | |
| 2021/0190641 A1 | 6/2021 | Oostendorp et al. | |
| 2021/0192714 A1 | 6/2021 | Bhatt et al. | |
| 2021/0201460 A1 | 7/2021 | Gong et al. | |
| 2021/0233229 A1 | 7/2021 | Hyatt et al. | |
| 2021/0287013 A1 | 9/2021 | Carter et al. | |
| 2021/0350115 A1 | 11/2021 | Bogan et al. | |
| 2021/0350495 A1 | 11/2021 | Liu et al. | |
| 2021/0383523 A1 * | 12/2021 | Simson | B25J 19/0066 |
| 2021/0390677 A1 | 12/2021 | Do et al. | |
| 2021/0390678 A1 | 12/2021 | Weiss et al. | |
| 2021/0398676 A1 | 12/2021 | Evans et al. | |
| 2021/0406977 A1 | 12/2021 | Ramachandran et al. | |
| 2022/0028052 A1 | 1/2022 | Li et al. | |
| 2022/0100850 A1 | 3/2022 | Sun et al. | |
| 2022/0217951 A1 | 7/2022 | Pan et al. | |

FOREIGN PATENT DOCUMENTS

| | | |
|---|---|---|
| CN | 111299166 A | 6/2020 |
| WO | WO 2013131058 A3 | 9/2013 |
| WO | WO 2017124074 A1 | 7/2017 |
| WO | WO 2020168094 A1 | 8/2020 |
| WO | WO 2021257507 A2 | 12/2021 |

OTHER PUBLICATIONS

International Search Report dated Jan. 20, 2022 for International Patent Application No. PCT/US2021/037331.

Caron et al., 2021, "Emerging Properties in Self-Supervised Vision Transformers," arXiv:2104.14294 (21 pages).

* cited by examiner

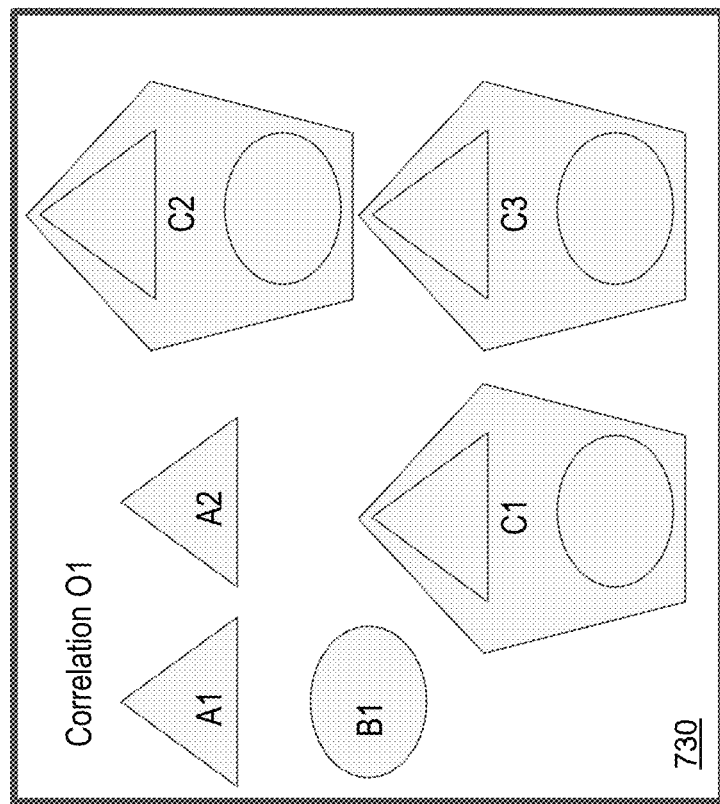
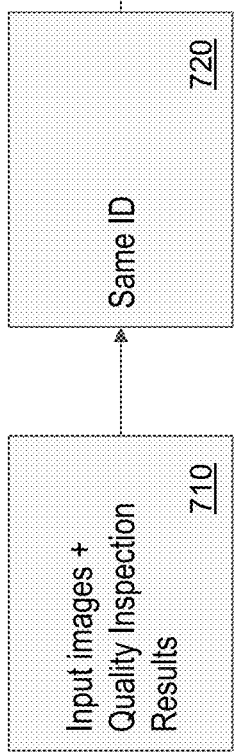
FIG. 7

CLOUD-BASED MULTI-CAMERA QUALITY ASSURANCE ARCHITECTURE

TECHNICAL FIELD

The subject matter described herein relates to advanced quality assurance techniques for configuring and implementing different image analysis inspection tools to characterize objects passing in front of two or more inspection camera modules such as on a production line, and displaying results and analyses to users.

BACKGROUND

Manufacturing and supply chain processes are becoming increasingly sophisticated through the adoption of advanced, high-speed automation systems. Given the high throughput of objects through these systems, frequent changeover of parts, as well as increased manufacturing and logistics demands, quality assurance activities can be difficult to implement. It is important to make the processes of procurement, setup and monitoring as easy as possible in order to drive adoption of automated camera-based quality inspection systems. Techniques such as minimizing hardware configurations, moving solutions from hardware to software domains, and providing insights and explainability around algorithm performance are examples of ways in which the process of implementing automated camera-based quality assurance systems can be made more simple.

SUMMARY

In a first aspect, data is received that includes a feed of images of a plurality of objects passing in front of a respective one of a plurality of inspection camera modules forming part of a quality assurance inspection system. The received data from each inspection camera module is analyzed (i.e., separately analyzed, etc.) using at least one image analysis inspection tool. Thereafter, results from the analyzing for each inspection camera module are correlated on an object-by-object basis. Access to the correlated results can be provided to a consuming application or process.

The correlated results can be stored in a remote cloud-based database and/or in a local database.

Each image analysis inspection tool can include a machine learning model trained for a particular one of the two or more inspection camera modules.

The objects can be moved in front of the inspection camera modules via a conveyance mechanism (which can be manually operated, automatic, semi-automatic, etc.).

In some variations, the inspection camera modules can utilize a same type of trigger to capture the respective feed of images. In other variations, at least two of the inspection camera modules can utilize a different type of trigger to capture the respective feed of images. The type of triggers can vary including hardware triggers, software triggers, or a combination of both. Further, in some variations, the software triggers can utilize machine learning to determine when to capture an image for the feed of images.

An inspection result can be generated for each object characterizing whether such objects are defective or aberrant based on the correlated results. This inspection result can be generated using a set of rules to determined that the object is defective or aberrant based on inspections of varying areas of interest (AOI) in the images. In such variations, one rule can provide that if one AOI is deemed to be defective or aberrant, the object is characterized as being defective or aberrant. Further, at least two of the AOIs for an image can, in some variations, be analyzed by different image analysis inspection tools.

At least one of the inspection camera modules can be at a different location relative to the other inspection camera modules such that a field of view of the inspection camera module at the different location does not overlap a field of view of any of the other inspection camera modules. In other variations, a field of view of each inspection camera module overlaps a field of view of at least one of the other inspection camera modules.

Each of the inspection camera modules can be connected to a single computing device having a clock. In such implementations, a timestamp can be assigned to each image using the clock. This timestamp can be used to associate images for a particular object as part of the correlation operation.

Two or more of the inspection camera modules can be connected to different computing device that each initially have a respective, non-synchronized clock. In such implementations, the clocks of the different computing devices can be synchronized. A timestamp can be assigned to each image using the corresponding clock for the computing device to which the respective inspection camera module is connected. These timestamps from the synchronized clocks can used to associate images for a particular object as part of the correlation operation. The clocks can be synchronized using a local and/or a remote Internet-based timeserver.

In some variations, a counter value can be assigned to each image (which can be in lieu of a clock timestamp). These counter values can be used as part of the correlation operations to associate images for a particular object.

A timing offset can be applied for images generated by one of the inspection camera modules based on a distance of such inspection camera modules relative to the other inspection camera modules. These timing offsets can be used as part of the correlation operation to associate images for a particular object.

One or more image analysis of the inspection tools can detect a unique identifier for each object. These unique identifiers can be used as part of the correlation to associate images for a particular object.

The unique identifier can take various forms including a barcode (e.g., a 2D bar code, a QR code, etc.), an alphanumeric string that can be detected by one of the image analysis inspection tools using optical character recognition (OCR), an identifier generated by a device in line to the manufacturing line such as a production line controller (PLC), and/or application generated unique identifiers.

The correlating can be performed locally (e.g., by an edge computer, an edge computer coupled to one of the image inspection modules, etc.), remotely by a cloud-based server, or a combination of both.

In some variations, the correlating can be performed via a combination of methods utilizing two or more of: timestamps, detected unique identifiers, or received unique identifiers.

In an interrelated aspect, data is received that includes a feed of images of a plurality of objects passing in front of each of a plurality of inspection camera modules forming part of a quality assurance inspection system. The data from each inspection camera module is analyzed (e.g., separately analyzed, etc.) using at least one image analysis inspection tool. The analyzing includes visually detecting a unique identifier for each object. The images are later transmitted with results from the inspection camera modules and the unique identifiers to a cloud-based server to correlate results from the analyzing for each inspection camera module on an object-by-object basis. Access to the correlated results can be provided to a consuming application or process via the cloud-based server.

In yet another interrelated aspect, data is received that includes a feed of images of a plurality of objects passing in front of each of a plurality of inspection camera modules forming part of a quality assurance inspection system. With this variation, each image has a corresponding timestamp. The received data from each inspection tool can be analyzed (e.g., separately analyzed, etc.) using at least one image analysis inspection tool. The images along with results from the inspection camera modules and the timestamps can be transmitted to a cloud-based server to correlate results from the analyzing for each inspection camera module on an object-by-object basis. Access to the correlated results can later be provided to a consuming application or process.

In still another interrelated aspect, data is received, for each of a plurality of stations, data that includes a feed of images of a plurality of objects passing in front of one or more inspection camera modules within the station. Each image can have a corresponding timestamp or identifier. The objects when combined or assembled, can form a product. The received data from each inspection cameral module can be analyzed using one or more image analysis inspection tools. Result from the analyzing for each inspection camera module from the plurality of stations can be correlated such that results across multiple stations can be viewed and processed in aggregate. Access can be provided to the correlated results to a consuming application or process.

The stations can be belong to a single line within a single manufacturing facility. In other variations, the stations belong to a multiple manufacturing lines within a single manufacturing facility or multiple manufacturing facilities.

In some variations, all of the objects forming the product have a single unique identifier which is used to correlate the results. In other variations, the objects forming the product have varying identifiers such that the correlation of results utilizes a set of user-provided rules to group the identifiers received to the product. With such variations, a first station of the plurality of stations can detect a first identifier and a second station of the plurality of stations can detect a second identifier different from the first identifier.

The correlation of results can further utilize a timestamp associated with each image that is particular to the station capturing such image.

The objects can take various forms including a final assembly or packaged version of the product, a partial assembled or packaged version of the product or a portion of the product, or subassemblies to combine to form the product.

In another interrelated aspect, data is received that includes a feed of images of a plurality of objects passing in front of each of a plurality of inspection camera modules forming part of each of a plurality of stations. The stations can together form part of a quality assurance inspection system. The objects when combined or assembled, can form a product. The received data derived from each inspection camera module can be analyzed using at least one image analysis inspection tool. The analyzing can include visually detecting a unique identifier for each object. The images can be transmitted with results from the inspection camera modules along with the unique identifiers to a cloud-based server to correlate results from the analyzing for each inspection camera module on an product-by-product basis. Access to the correlated results can be provided to a consuming application or process via the cloud-based server.

In still another interrelated aspect, data is received that includes a feed of images of a plurality of objects passing in front of each of a plurality of inspection camera modules forming part of each of a plurality of stations. The stations together forming part of a quality assurance inspection system. The objects when combined or assembled, can form a product. Each of the images has a corresponding timestamp. The received data derived from each inspection camera module can be separately analyzed using at least one image analysis inspection tool. The images can be transmitted along with results from the inspection camera modules and the timestamps to a cloud-based server to correlate results from the analyzing for each inspection camera module on an product-by-product basis. Access to the correlated results can be provided to a consuming application or process.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter simplifies manufacturing, procurement and configuration of the hardware and software components required to install and obtain value from a camera-based quality assurance inspection system.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 7 is a diagram illustrating correlation of objects generated by various stations in which the utilized objects have a same identifier;

Like reference symbols in the various drawings indicate like elements.

DETAILED DESCRIPTION

The current subject matter is directed to a multi-camera architecture for identifying anomalous or other aberrations on objects within images with particular application to quality assurance applications such as on production lines, inventorying, and other supply chain activities in which product/object inspection is desirable. The techniques herein leverage computer vision, machine learning, and other advanced technologies. The techniques encompass both hardware and software methodologies with a shared primary goal of making camera-based quality inspection systems easier to use. Ease of use can be achieved through methodologies including removing the need for commonly used hardware components, including multiple variants of hardware components and allowing the user to switch between them via a software interface, and visualizing the output and/or decisions of complex algorithmic processes such as machine learning algorithms in order to make the system interface more interpretable to an average user. Further, the generated data can be stored locally, remotely (e.g., in a cloud computing system, remote database, etc.) and/or stored on a combination of same.

Figure 1:
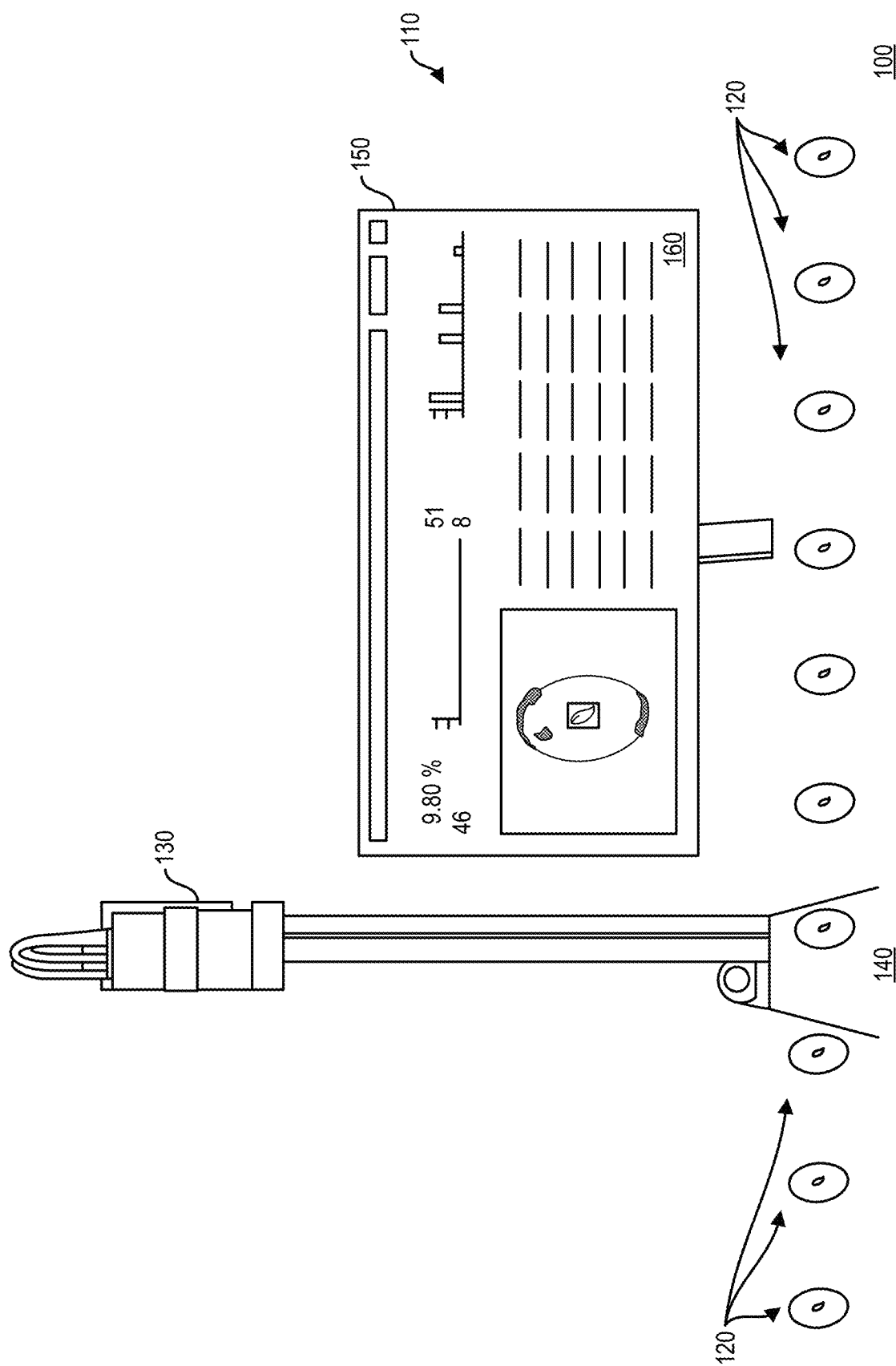
FIG. 1 is a diagram illustrating a production line system providing object anomaly visualizations with a single inspection camera module.

FIG. 1 is a diagram 100 illustrating an example production line 110 in which there are a plurality of objects 120 which pass within the field of view 140 of an inspection camera module 130. The production line 110 can, for example, include a conveying mechanism (e.g., belt, etc.) as part of one or more manufacturing and/or quality assurance processes that is configured such that each of the objects 120 pass through the field of view 140 of the inspection camera module 130. The production line 110 can alternatively include a camera mounted in a fixed location in front of which an operator manually places a product in lieu of a conveying mechanism. A visualization system 150 can comprise one or more computing devices and electronic visual display 160. The visualization system 150 can either obtain data locally from the inspection camera module 130 or remotely through an IoT connection to the connected inspection camera module 130. The IoT connection can be facilitated directly in a peer-to-peer fashion or through cloud servers. The electronic visual display 160 can render one or more graphical user interfaces which, as will be described in further detail, can visualize the objects 120 as they pass within the field of view 140 along with an overlay comprising complementary information generated by one or more image analysis inspection tools. The visualization of the object along with the overlay is sometimes referred to herein as a composite object image 170. The complementary information can take varying forms including, for example, position information (e.g., location of barcodes, location of text, locations of features, locations of components, etc.), defect information (e.g. the location, size, severity, etc. of imperfections identified by the image analysis inspection tools), or variations in aspects of the objects such as dimensions, coloring, and the like which may potentially make the object less desirable according to various quality assurance assessments. The complementary information can be delivered in an image-based format with red, green, blue and alpha channels so that the tool can return a full-color image with optional transparency.

The objects 120 can either be partially completed versions of a "final object" being produced, subassemblies to be used in production of a "final object", or the "final object" itself. Stated differently, the current subject matter is applicable to finished products as well as the various components making up the products throughout their respective manufacturing line processes. As the objects 120 pass through the inspection line process they may be modified, added to, and/or combined, and it is interesting to the end user to be able to correlate pictures of these various objects throughout the inspection line process. The object and/or its subassemblies may be processed at multiple different locations at various points in time, and the system described provides a technique to correlate all images of the final object across these points in space and time.

Figure 2:
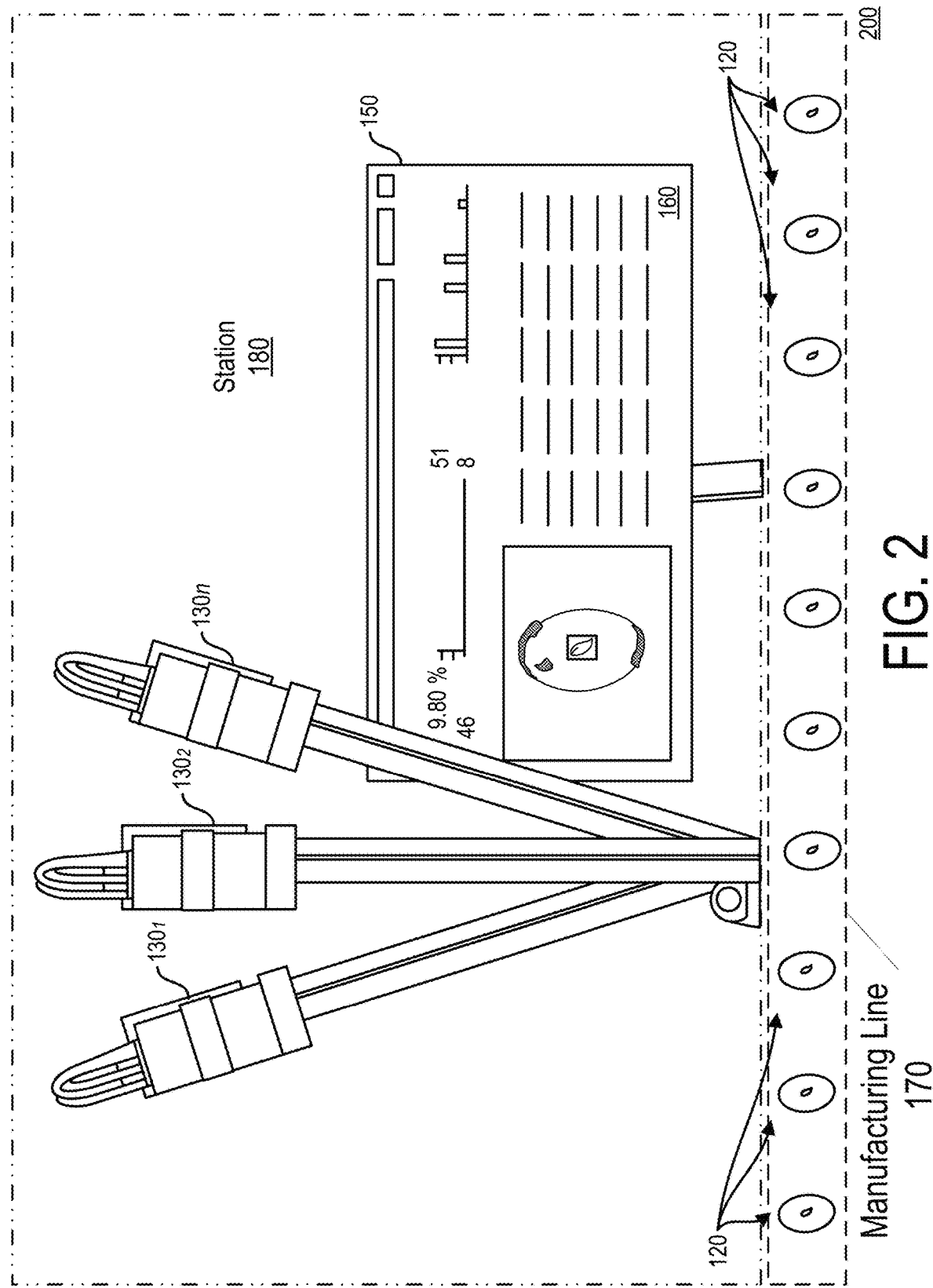
FIG. 2 is a diagram illustrating a production line system providing object anomaly visualizations with two or more inspection camera modules that have overlapping FOVs.

While the example of FIG. 1 illustrates a single inspection camera module 130 and a local visualization system 150, it will be appreciated that multiple inspection camera modules $130_1 \ldots _n$ can be utilized to form a station 180 (such as illustrated in diagram 200 of FIG. 2) and the graphical user interfaces can be rendered on various local and remote computing devices either in real-time/near-real time as well as on-demand (i.e., historical data can be reviewed, etc.). The station 180 (or stations $180_1 \ldots _n$) can be placed at various positions along a manufacturing line 170. The multiple inspection camera modules $130_1 \ldots _n$ can be positioned at different angles and/or can be spatially distant (i.e., capture images of objects at different parts of a manufacturing line 170, etc.). In some variations, such as in FIG. 2, a portion of the corresponding field of view for some of the multiple inspection camera modules $130_1 \ldots _n$ can overlap. In other variations, such as in diagram 300 of FIG. 3, multiple inspection camera modules $130_1 \ldots _n$ can be arranged such that their respective fields of view do not overlap. Such an arrangement can, for example, be technically advantageous in that different aspects of the objects 120 during their processing (i.e., manufacturing, assembly, packaging, etc.) can be characterized.

Figure 4:
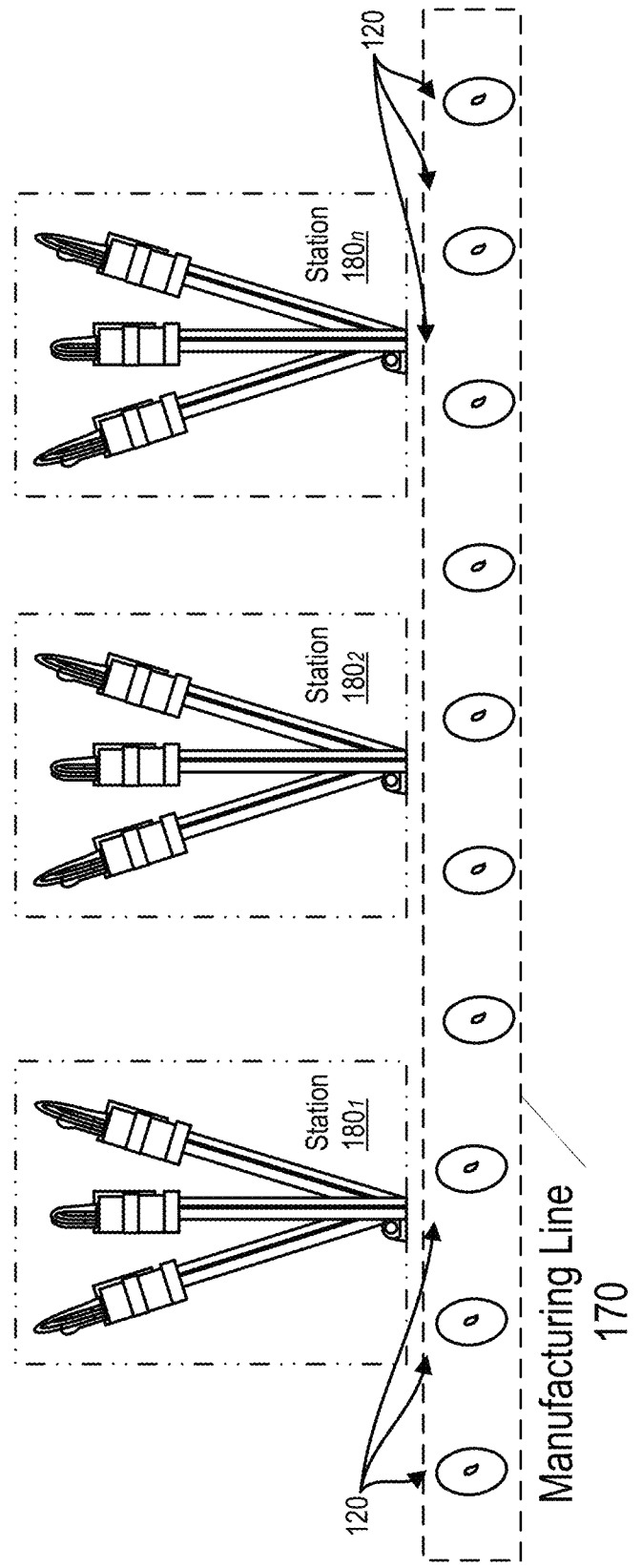
FIG. 4 is a diagram illustrating a production line system providing object anomaly visualizations with two or more stations having two or more inspection camera modules.

FIG. 4 is a diagram 400 that illustrates an object proceeding through a manufacturing line 170 and being inspected at multiple points on the same manufacturing line 170 corresponding to different stations $180_1 \ldots _n$. A manufacturing line 170 can be defined as a process in which an object is produced within a single physical location such as a room or building. Each inspection point is hereafter referred to as a station 180. Each station 180 can have up to n inspection camera modules $130_1 \ldots _n$. Images and quality assurance decisions can be correlated on a per-station basis as well as across the various stations $180_1 \ldots _n$ that are part of the manufacturing line 170.

Figure 5:
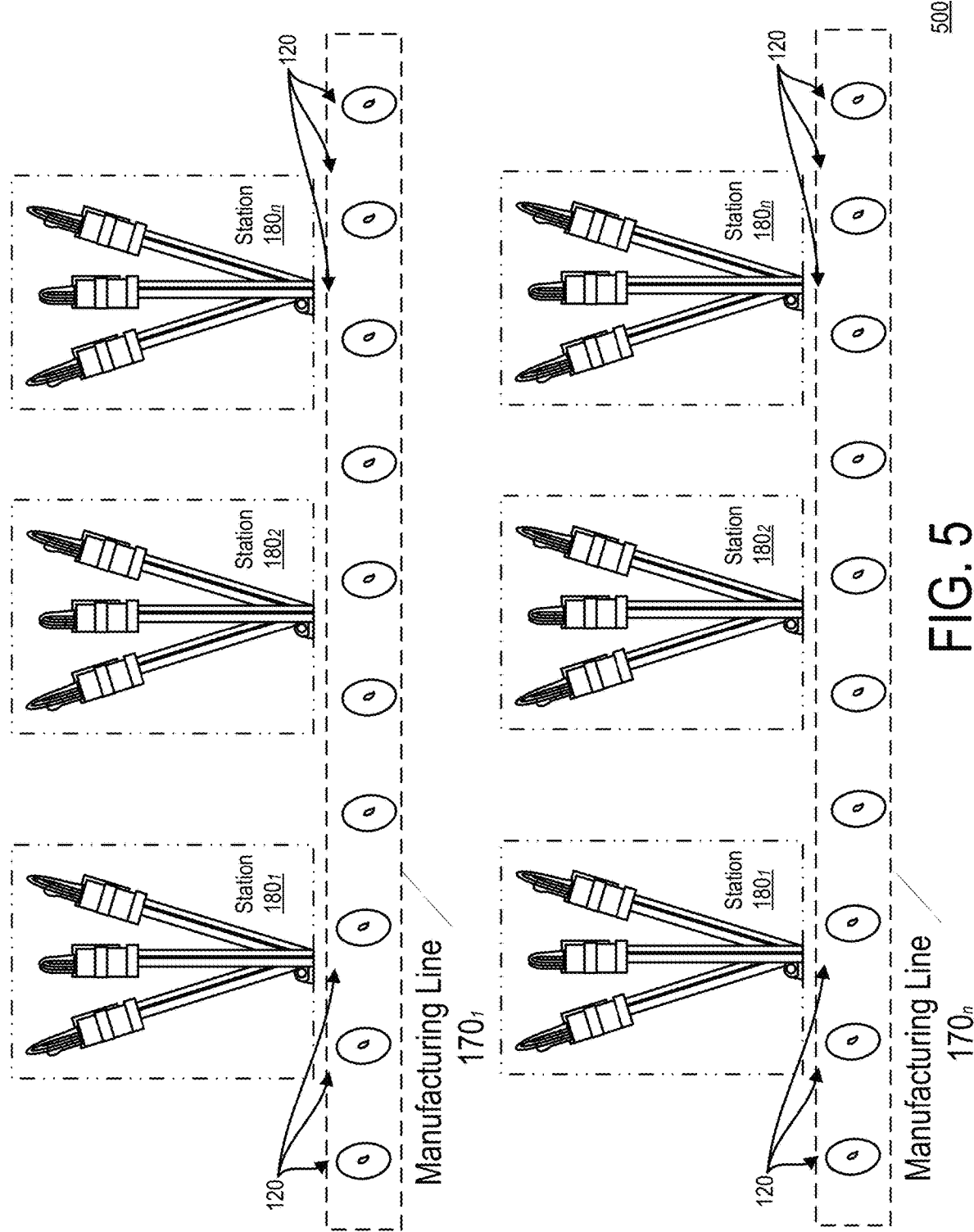
FIG. 5 is a diagram illustrating a production line system providing object anomaly visualizations with two or more stations across different manufacturing lines.

FIG. 5 is a diagram 500 illustrating a manufacturing facility having multiple manufacturing lines $170_1 \ldots _n$. Manufacturing facilities can have multiple manufacturing lines $170_1 \ldots _n$ or a single manufacturing line 170 which may be spatially distant across different areas (e.g., rooms, zones, manufacturing facilities, etc.) and/or which involve differing equipment forming part of the manufacturing process. The stations $180_1 \ldots _n$ can provide data generated by their respective inspection camera modules $130_1 \ldots _n$ to a remote computing system (e.g., remote server, cloud computing, system, etc.). As noted above, a manufacturing process for an object can include a single or multiple manufacturing lines 170 across a single or multiple manufacturing facilities. It is desirable to track quality assurance decisions and metadata across the sum of manufacturing processes for an object or company, and the techniques described herein describe how to accomplish this.

Advances in manufacturing allow for manufacturing processes to handle objects ranging from raw materials to complex electrical assemblies and the like. For example, a manufacturing process can include inputs such as components, raw materials, etc. being input to a single manufacturing line 170 and being output as a final product. These inputs can also include a partially manufactured object or objects. The inputs to a manufacturing line 170 are sometimes referred to herein as "manufacturing inputs.

As noted above, a manufacturing process can include multiple manufacturing lines 170 which, in turn, can be in adjacent or non-adjacent physical locations. The non-adjacent physical locations can be within the same manufacturing facility or within multiple manufacturing facilities. The output of an initial manufacturing line 170 can be processed immediately or soon thereafter through one or more subsequent manufacturing lines 170, or the output can be processed through one manufacturing line 170 and stored so that it can be subsequently be processed in the subsequent manufacturing lines. The subsequent manufacturing line 170 can perform further modifications or improvements on the output from the first manufacturing line 170. Other variations are possible in which differing manufacturing lines 170 generate different objects 120 (e.g., different components, sub-assemblies, etc.) at different insertion points into an overall manufacturing process. Further, one or more of the manufacturing lines 170 can have a corresponding station 180.

Figure 6:
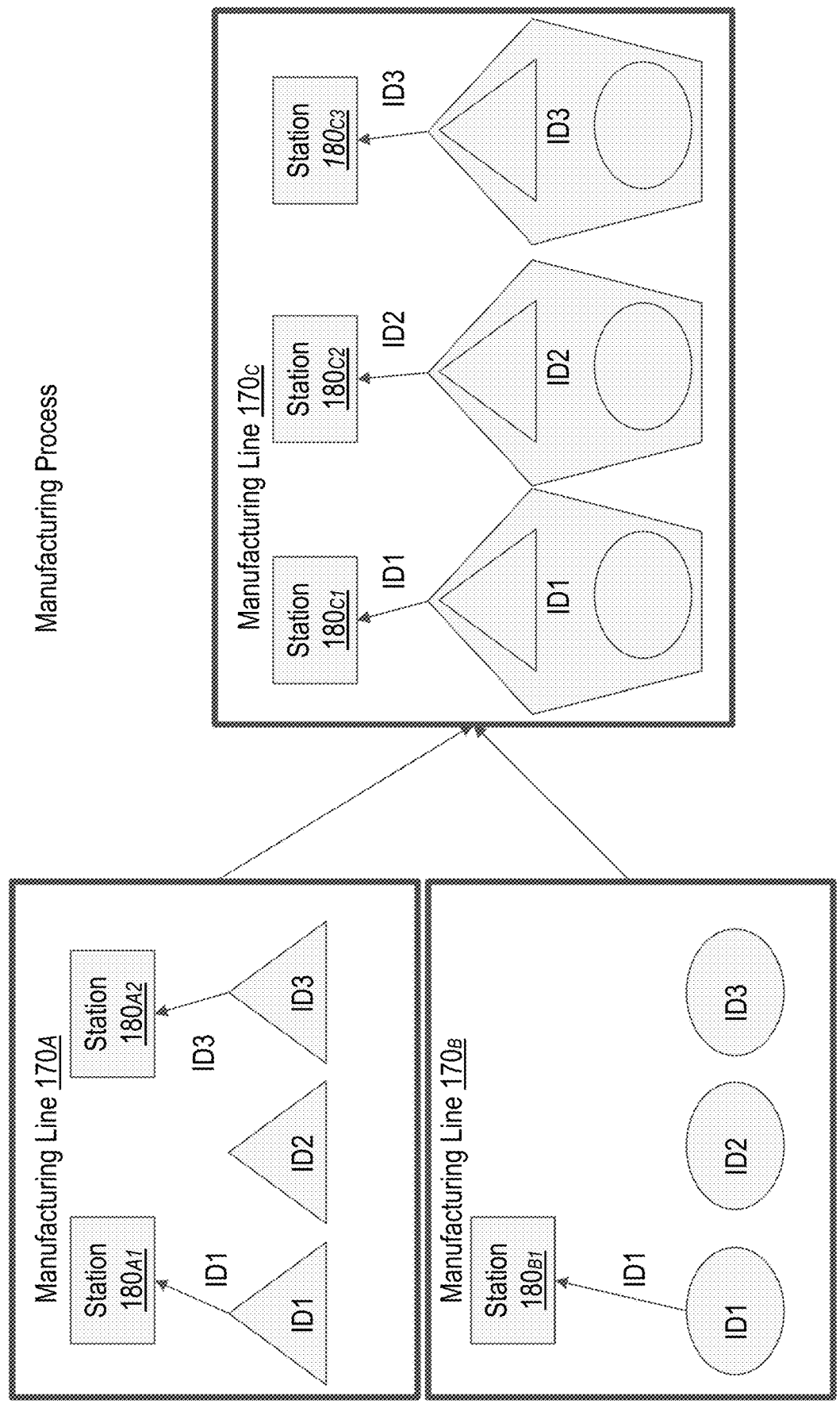
FIG. 6 is a diagram illustrating assembly of products across different manufacturing lines in which the utilized objects have a same identifier.

FIG. 6 is a diagram 600 illustrating how correlation can be performed across multiple manufacturing lines $170_A$, $170_B$, $170_C$ by utilizing a same shared unique identifier per final product (e.g., ID1, ID2, ID3, etc.) being produced that is common to all subassemblies, or subcomponents of the final product (here produced by manufacturing line $170_C$) across the various manufacturing lines 170 producing the product. This unique identifier, as discussed further on, can be provided by a PLC or software application, or, alternatively, it can be scanned or otherwise read from the product using techniques such as barcodes, QR codes, other types of scannable codes, Optical Character Recognition (OCR) on printed text, or other methods or algorithms for scanning printed text. In this scenario, the same unique identifier is associated with all subassemblies, subcomponents, or intermediate versions of the object 120 being inspected at the various manufacturing stations 180 across all manufacturing lines 170 and manufacturing facilities.

FIG. 7 is a diagram 700 illustrating correlation being performed using the same unique identifier to group all inspection images and quality assurance results for all stages of production of a final object. All results (e.g., input images, quality inspection results, etc.) from all stations (710) identified otherwise being associated with ID1 (720) are grouped together into Correlation O1 (730). There is one result in the correlation per station. The user can then see results of the object at all stations in the manufacturing process.

Figure 8:
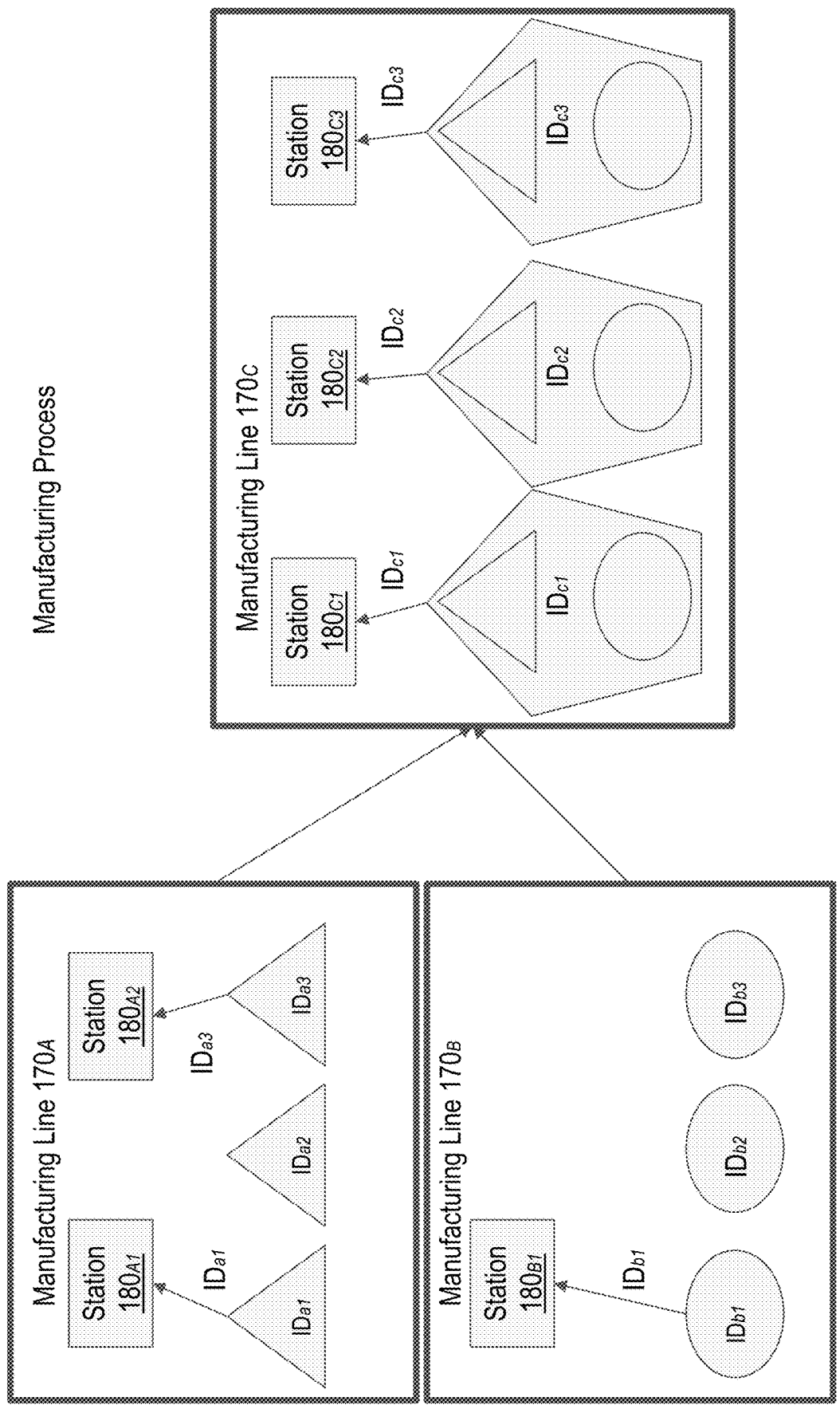
FIG. 8 is a diagram illustrating assembly of products across different manufacturing lines in which the utilized objects have varying identifiers.

FIG. 8 is a diagram 800 illustrating how correlation can be performed across different manufacturing lines $170_A$, $170_B$, $170_C$ by utilizing a combination of at least two unique identifiers to correlate the images and quality assurance metadata across the stations, manufacturing lines and manufacturing facilities into a grouping for a single output object. In this figure, each station $180_{A1 \ldots A3}$ in the manufacturing process can receive or have a different unique identifier.

These unique identifier can be mapped to a single product in a local or remote data store as part of a correlation process or otherwise.

Figure 9:
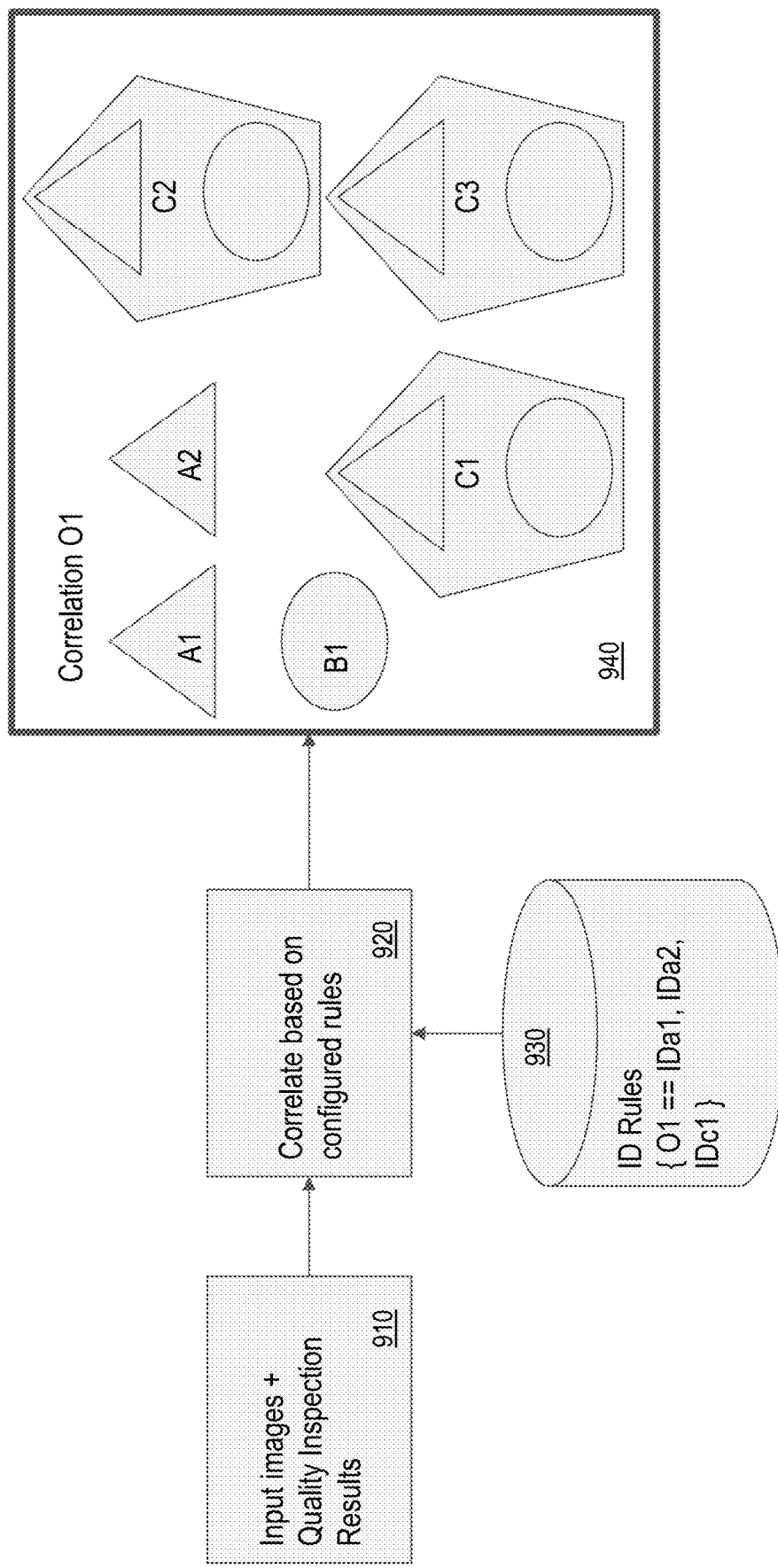
FIG. 9 is a diagram illustrating correlation of objects generated by various stations in which the utilized objects have varying identifiers.

FIG. 9 is a diagram 900 that shows the correlation (920) of input images and quality inspection results (910) using a set of rules or database (930) which can be default rules or rules configured or otherwise specified by the user. The rule can be used to create a mapping between the multiple unique identifiers from the stations to a single output object as part of the correlation (940). The unique identifier, as discussed further on, can be provided by a PLC or software application, or, alternatively, it can be scanned or otherwise read from the product using techniques such as barcodes, QR codes, other types of scannable codes, Optical Character Recognition (OCR) on printed text, or other methods or algorithms for scanning printed text.

Within a station 180, not all inspection camera modules 130 need to detect the identifier used for cross-station correlation. Correlation between the inspection camera modules 130 in a station 180 can be done utilizing synchronized timestamp or other methods discussed later. As long as one inspection camera module 130 within the station receives the unique identifier, same or otherwise, to be used for correlation, the final output correlation can be produced utilizing all results from all inspection cameras in all stations.

Historical data can be saved locally on the camera system 130 and/or stored in a cloud database. This data can be correlated such that the various views of the objects 110 can be easily obtained for subsequent analysis or other processing. With the variation in FIG. 2, the timing of the capturing of the respective multiple inspection camera modules $130_{1...n}$ can be based on a trigger which can, for example, be a hardware trigger in which movement of the objects 120 and/or an underlying conveyance mechanism causes the objects 120 to activate a switch (e.g., a mechanical switch, an electromechanical switch, and optical switch, etc.). In other variations, the utilized triggers can be software-based (and some of those software-based triggers may use machine learning and/or computer vision techniques to determine when to capture an image and/or which images to discard from a video feed). In yet other variations, the utilized triggers can be a combination of software and hardware. Further details regarding triggers that can be used in this regard can be found in U.S. patent application Ser. No. 17/341,304 filed on Jun. 7, 2021, the contents of which (including, but not limited to, those aspects directed to triggering) are hereby fully incorporated by reference.

Figure 10:
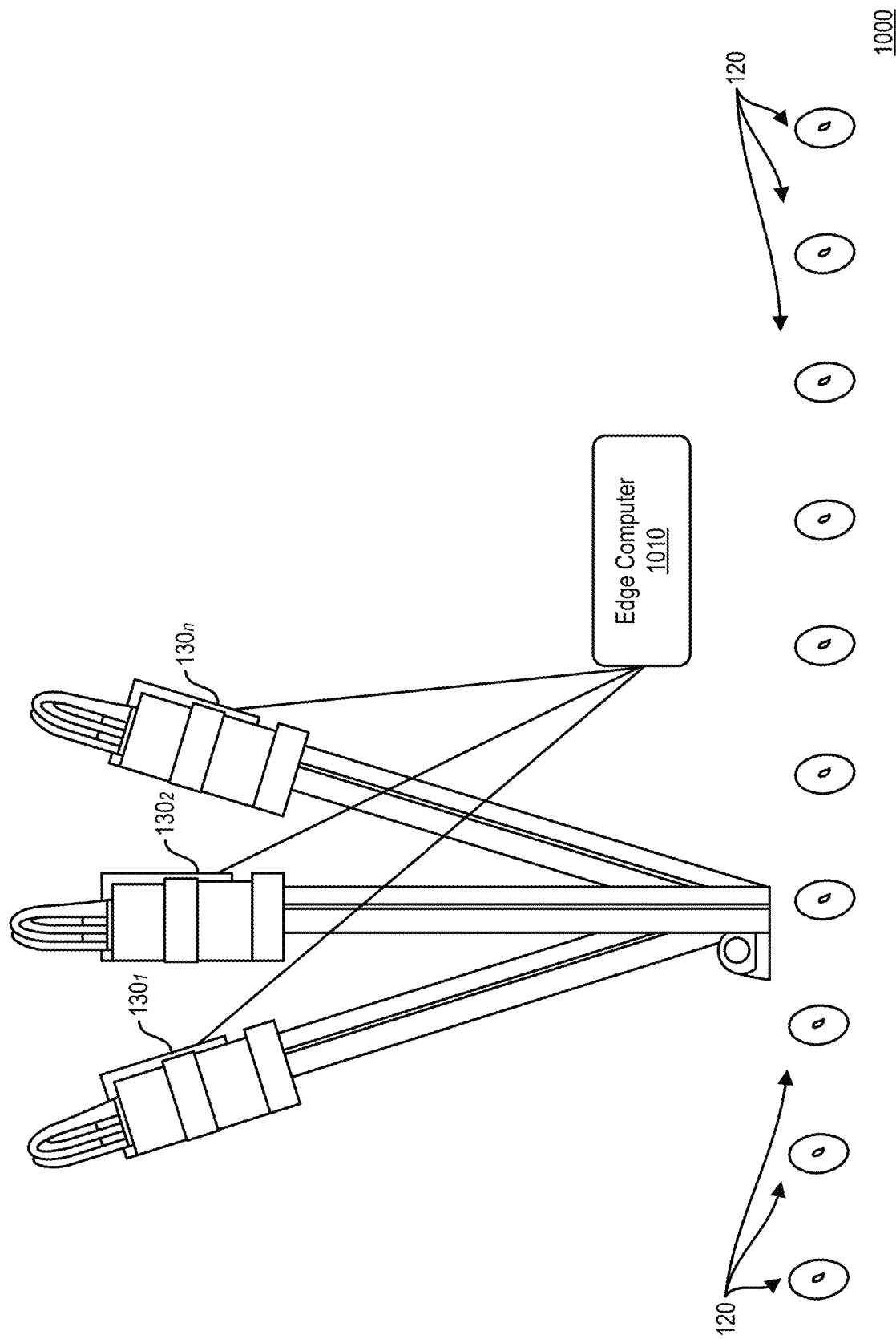
FIG. 10 is a diagram illustrating a production line system providing object anomaly visualizations with two or more inspection camera modules coupled to a single edge computer.

One of the issues addressed with the current subject matter is the correlation of data obtained by multiple inspection camera modules $130_{1...n}$ so that relevant information about the objects 120 can be used by a consuming application or process such as historical review of manufacturing practices, etc. In the variation of diagram 1000 of FIG. 10, the multiple inspection camera modules $130_{1...n}$ can be connected to a single edge computer 1010. This edge computer 1010 can include one or more processors (which in turn may have multiple cores) and memory for executing operations as described herein. The edge computer 1010 can receive captured images from each of the multiple inspection camera modules $130_{1...n}$ and apply a timestamp to such objects. This timestamp can be used to correlate the captured images with the corresponding objects 120. The timestamp can be generated in various fashions, including, for example, using a clock forming part of the circuitry of the edge computer 1010 and/or it can be a software-based clock or other counter (a physical device or software process that stores a number of times a particular event or process has occurred, etc.). The counter, for example, can increment over pre-defined frequencies which may differ from that of a clock on the corresponding computing device (e.g., edge computer 1010, etc.).

Figure 11:
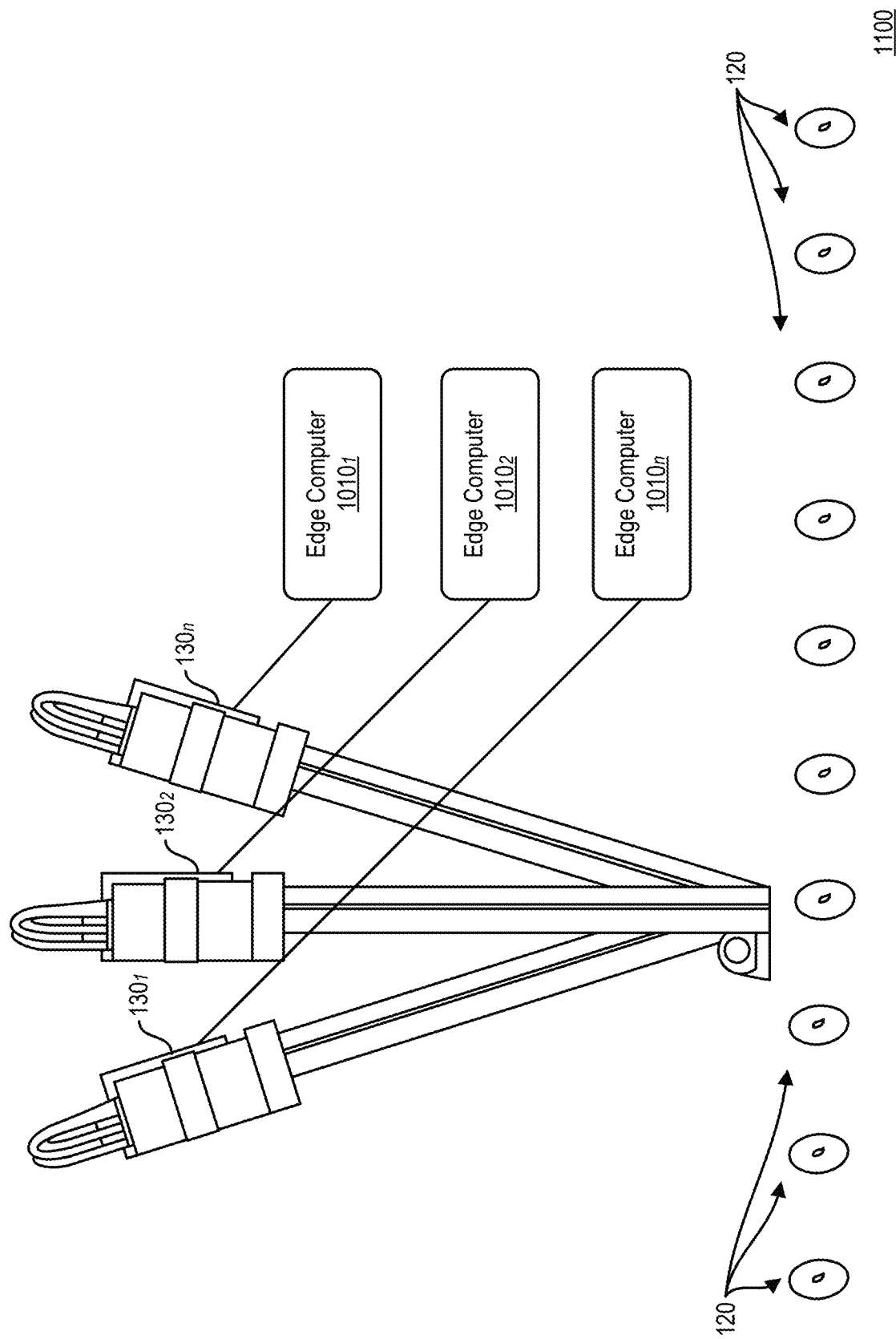
FIG. 11 is a diagram illustrating a production line system providing object anomaly visualizations with two or more inspection camera modules coupled to two or more edge computers.

In the variation of diagram 1100 of FIG. 11, each of the multiple inspection camera modules $130_{1...n}$ can be connected to different edge computers $1010_{1...n}$ which have synchronized clocks (using synchronization techniques as described below).

Figure 12:
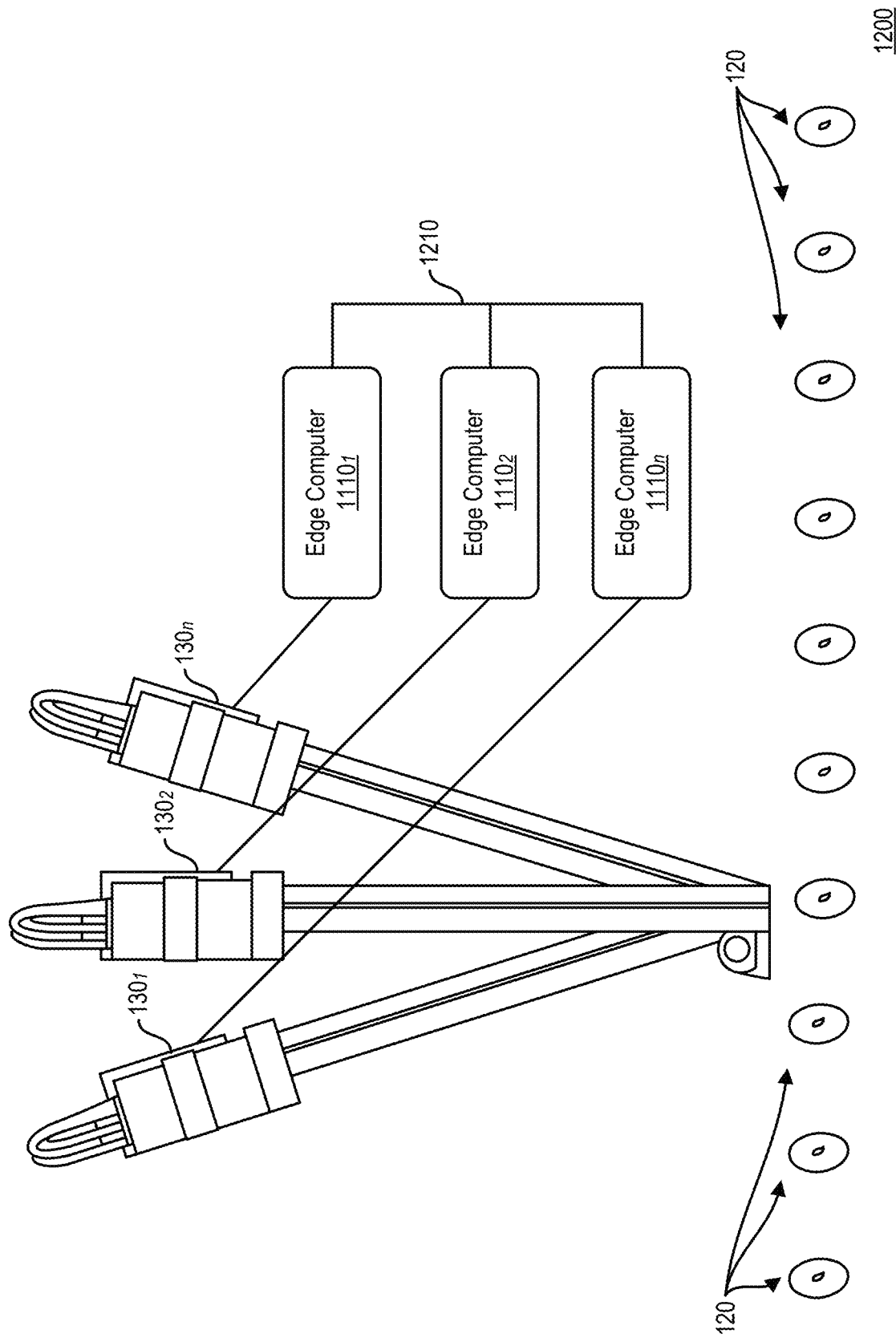
FIG. 12 is a diagram illustrating a production line system providing object anomaly visualizations with two or more inspection camera modules coupled to two or more networked edge computers.

In the variation of diagram 1200 of FIG. 12, each of the multiple inspection camera modules $130_{1...n}$ can be connected to different edge computers $1010_{1...n}$ which are connected to a single network 1210. This network 1210 can, for example, be a local area network which can be used to synchronize timestamps for the images received from the various inspection camera modules $130_{1...n}$. Various synchronization protocols can be implemented so as to ensure that the clocks of the multiple inspection camera modules $130_{1...n}$ are synchronized time-wise. One example of a protocol that can be utilized is the network time protocol (NTP). Other times of protocols that can be used include, but are not limited to, simple network time protocol (SNTP), precision time protocol (PTP) and the like.

Figure 13:
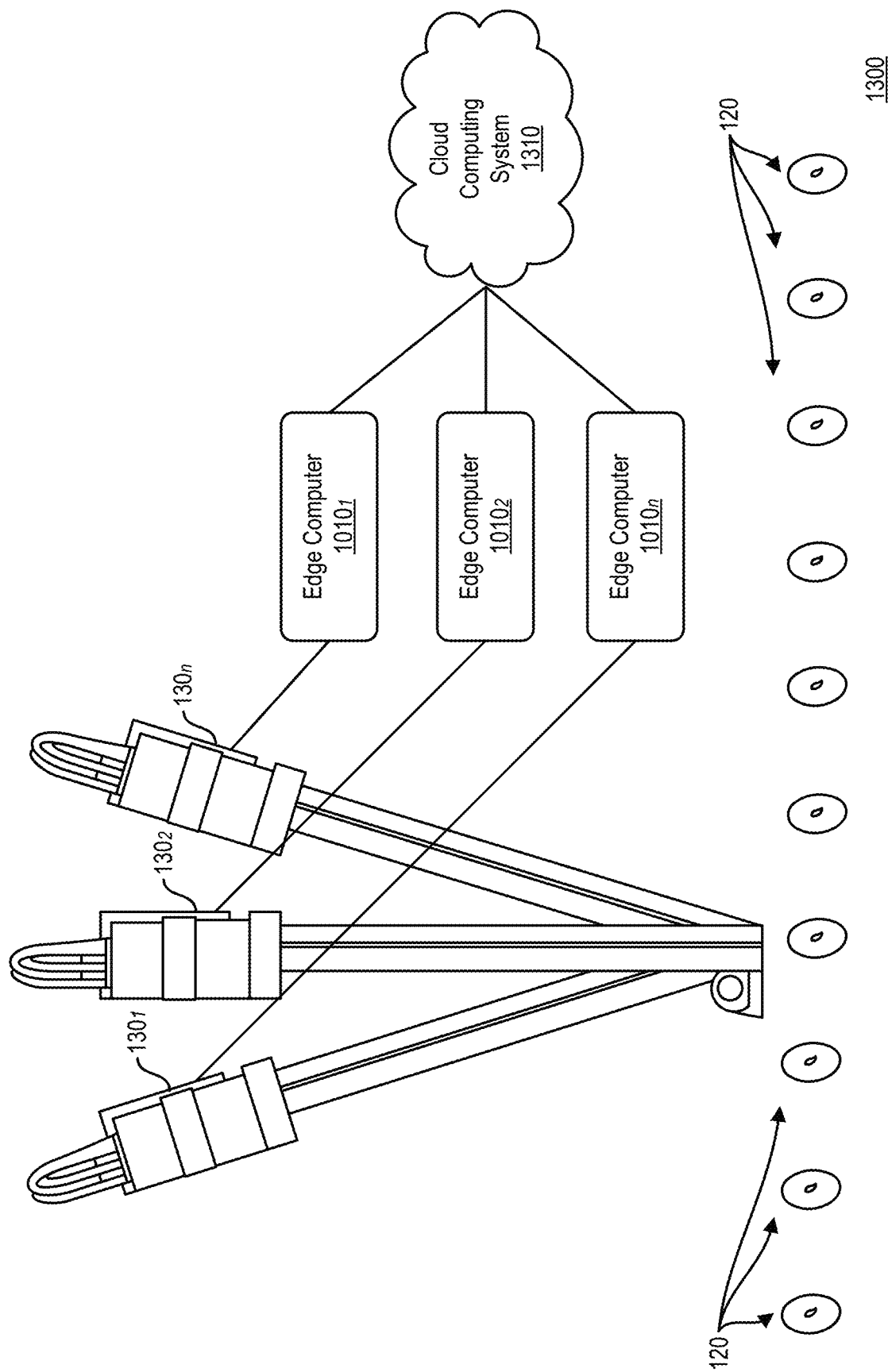
FIG. 13 is a diagram illustrating a production line system providing object anomaly visualizations with two or more inspection camera modules coupled to a cloud computing system.

In the variation of diagram 1300 of FIG. 13, each of the multiple inspection camera modules $130_{1...n}$ can be connected to a cloud computing system 1310 (e.g., one or more servers having remote processing and storage, etc.). The cloud computing system 1310 can synchronize its local servers and the using protocols such as NTP, SNPT, PTP, and the like.

Results from the pipeline are now published to a "cloud application", where the results contain all of the data that they did previously, but now have this additional synchronized timestamp and/or unique identifier (as described below).

Figure 14:
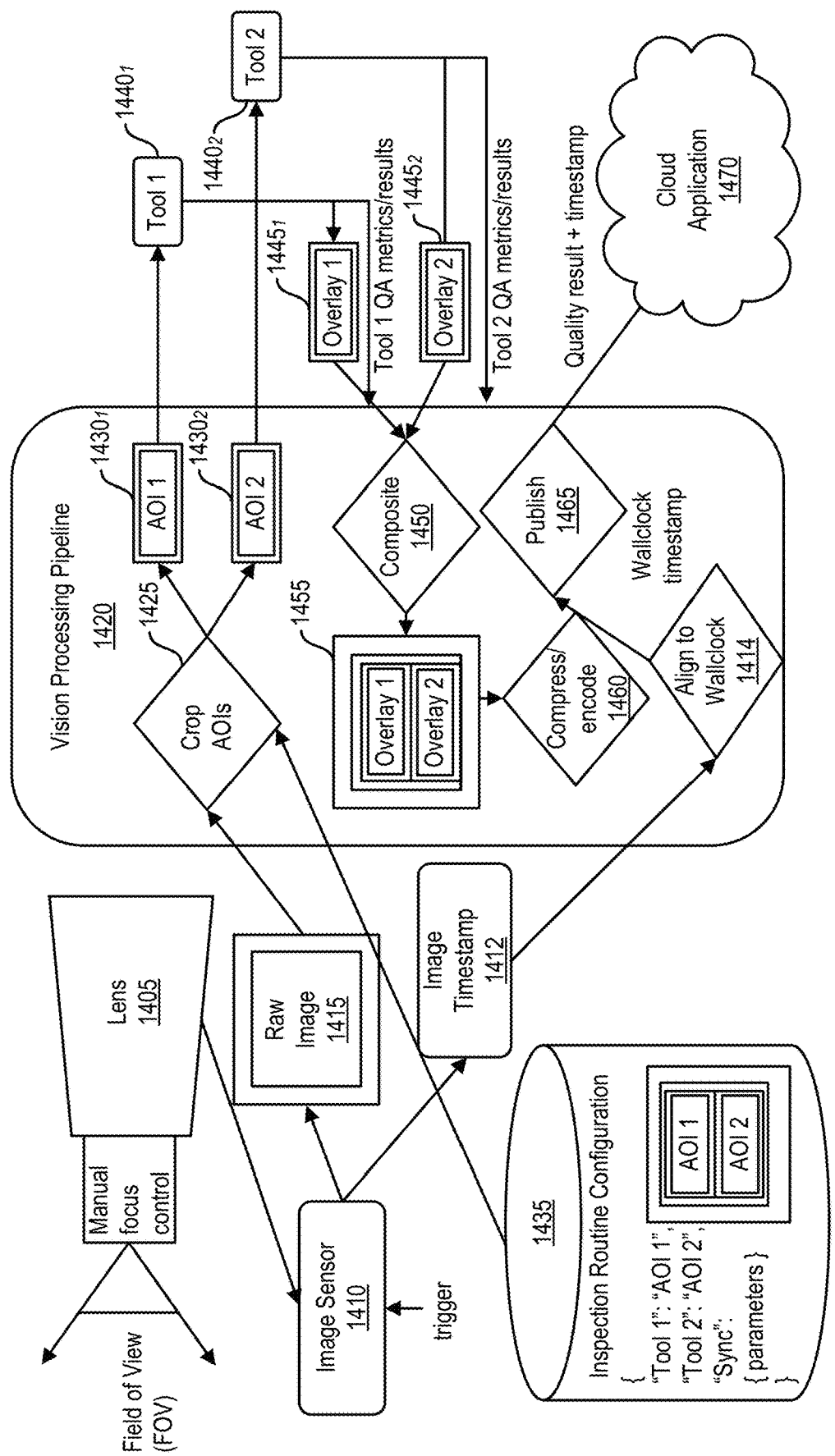
FIG. 14 is a diagram illustrating an image processing workflow using a cloud application.

FIG. 14 is a diagram 1400 illustrating a workflow utilized by a vision processing pipeline. An image sensor 1410 which can form part of an inspection camera module generates a raw image 1415 which, in some cases, can be part of a feed of raw images that correspond to objects to be analyzed or otherwise inspected. In some cases, there can be a mechanical (e.g., switch, etc.) and/or electromechanical (e.g., light source and corresponding sensor, etc.) trigger which causes the image sensor 1410 to capture an image of a corresponding object as described above. Alternatively or in combination, a software-based trigger can also be used. The image sensor 1410 can be coupled to one or more lenses 1405 to capture images within a particular field of view (which can, for example, be determined by the focal length of the lense(s)). A vision processing pipeline system 1420 receives the raw image 1415 and selectively (and optionally) crops 1425 aspects of the image based on areas of interest (AOIs) to result in two or more AOIs $1430_1$, $1430_2$.

The image sensor 1410 can assign a timestamp 1412 to each raw image 1415 which is based on a local clock and/or local counter running a certain frequency, etc. In some cases, this timestamp 1412 is not synchronized to any other systems. In such cases, the vision processing pipeline 1420 can perform operations so as to align the image timestamp 1412 and to a synchronized clock 1414. These operations can, include, performing synchronization using various protocols including NTP, SNTP, PTP, and the like.

Aspects which define the boundaries of the AOIs (which can be static or dynamic based on the particular raw image 1415) can be specified within an inspection routine configuration 1435. An AOI as used herein can be specified as a region (x, y, width, height) within an image that should be further analyzed. In some cases, if there are multiple AOIs, one or more of such AOIs can overlap.

The inspection routine configuration 1435 can also specify which of image analysis inspection tools $1440_1$, $1440_2$ is to analyze the corresponding AOI of the raw image 1415. The vision processing pipeline 1420 can cause the AOIs $1430_1$, $1430_2$ to be respectively passed or otherwise transmitted to or consumed by the different image analysis inspection tools $1440_1$, $1440_2$. Each of the image analysis inspection tools $1440_1$, $1440_2$ can generate information complementary to the object within the raw image 1415 which can take the form of a respective overlay $1445_1$, $1445_2$. Such complementary information can take various forms including, for example, various quality assurance metrics such as dimensions, color, and the like as well as information as to the explainability of the decisions by the image analysis inspection tools $1440_1$, $1440_2$ (e.g. why a machine learning model believes an item to be defective and/or to the extent of the defective region found on the product, etc.)

The vision processing pipeline 1420 can generate a composite overlay 1450 based on the respective overlays $1445_1$, $1445_2$. The weighting and/or transparency in which the overlays $1445_1$, $1445_2$ can be combined can be pre-specified in some cases. The vision processing pipeline 1420 can then combine the composite overlay 1450 with the raw image 1415 to result in a composite object image 1455. That composite object image 1455 can then be compressed or otherwise encoded 1460 and then published 1465 for access by a cloud application 1470. In some cases, the cloud application 1470 can correspond to a product line visualization system.

The published information sent to the cloud application 1470 can include one or more of: explainability/complementary information, visual overlays as well as information from the image analysis inspection tools $1440_{1\ldots n}$. The image analysis inspection tools $1440_{1\ldots n}$ can specify one or more of: results (e.g., pass/fail, etc.) for each AOI, tool metadata (e.g., detailed information about the result of the tool including explainability information), read bar codes, read text (via OCR), the confidence of utilized machine learning/computer vision models, and the synchronized timestamp for each picture.

Figure 3:
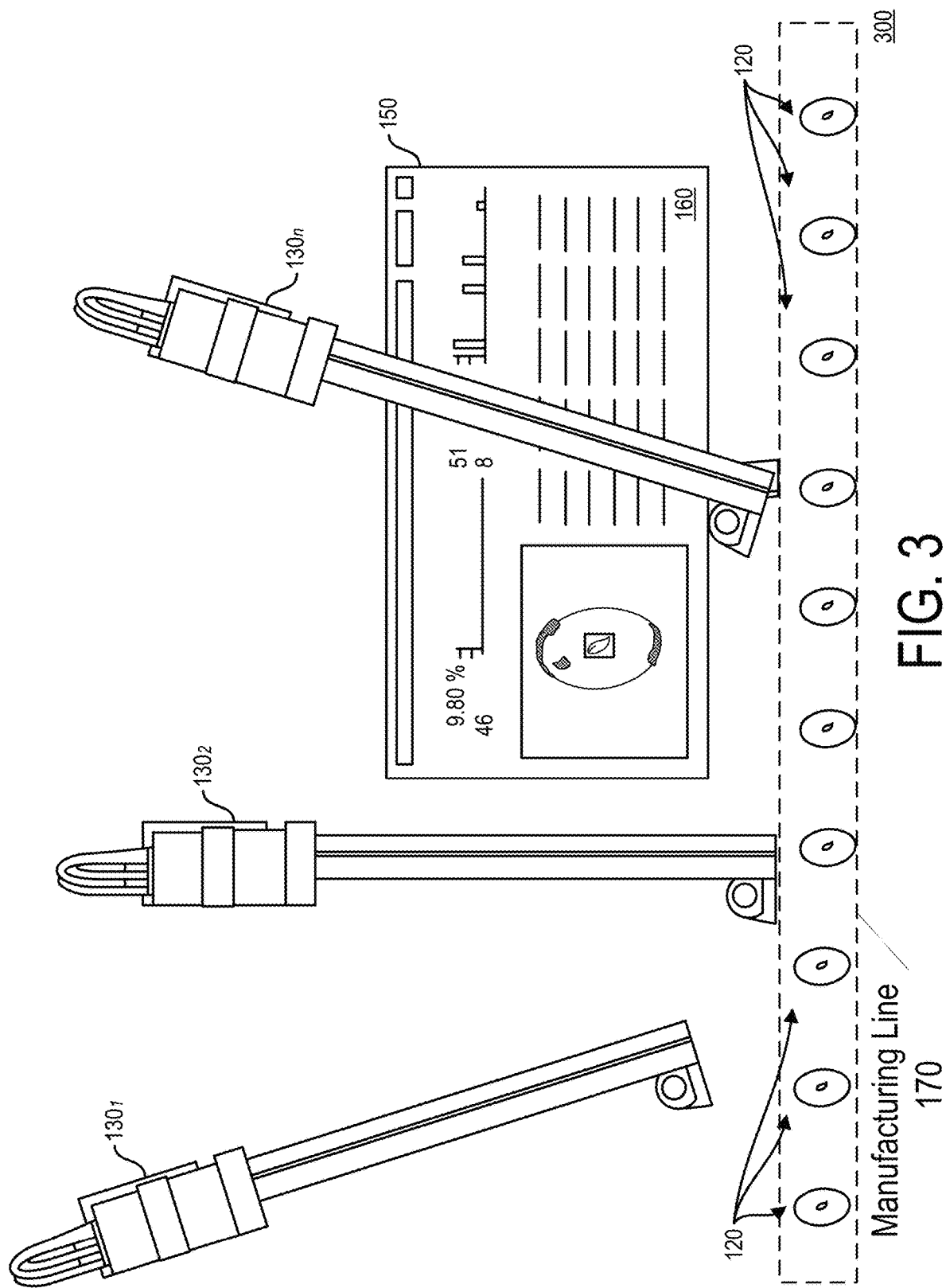
FIG. 3 is a diagram illustrating a production line system providing object anomaly visualizations with two or more inspection camera modules that are spatially distant.

The image analysis inspection tools 1440 can take various forms including, for example, computer vision or machine learning algorithms whose function is either to modify the raw image for the purpose of allowing other tools to inspect it, or which consume an AOI and provide quality inspection analysis and complementary information back to the vision processing pipeline (such as tools $1440_1$ and $1440_2$) in FIG. 3. Example image analysis inspection tools 1440 can include or otherwise execute one or more of an alignment algorithm, either computer vision (CV) or machine learning (ML)-based, which takes the raw image along with a reference image configured in the inspection routine configuration 1435 which then applies shift, warp, translate or similar operations to conform the content of the raw image so that it more closely resembles the reference image in the inspection routine configuration 1435; a color filter algorithm which converts the color space, perhaps using a HSV or RGB filter, to a monochrome image space; or algorithms which sharpen or blur the content of the image.

Image analysis inspection tools can be configured by the user. A part of the configuration may be an image or set of images, referred to herein as reference image or images, which the user believes are standard, typical, or otherwise exemplary images of the product with respect to the total corpus of images which may be obtained of the product during the quality assurance inspection application. Further, a part of the configuration may be an image or set of images, referred herein to as the training image or images, which the user labels or otherwise marks, which are to be used in conjunction with an image analysis inspection tool which, as part of its configuration, requires the training of a computer vision or machine learning model. A user label or mark on the training images may be "pass" or "fail" to indicate if the image is that of a product which should be considered to be passing or failing by the image analysis inspection tool. The label or mark may also be that of a particular class, where a class may be a single descriptor that is a member of a set of descriptors which can be used to describe an image of the product being inspected. An example of a class may be "A", where the set of classes may be ["A", "B", "C"], if the image analysis inspection tool is being configured to determine if product variant "A", "B", or "C" is present in the image.

When an image analysis inspection tool 1440, which has been configured with a reference image or images, a training image or images, or all of the preceding, is producing quality assurance metrics on an image or feed of images 1415, it is optimal for the image or feed of images 1415 to be visually similar to the reference image or images and/or the training image or images. The closer the visual similarity between the image 1415 and the reference and/or training images, the more likely the image analysis inspection tool will perform its function properly. Machine learning models, in particular, can often perform poorly on "out of sample" images, where "out of sample" images are images on which the model has not been configured or trained. It can be useful to come up with a score, hereafter referred to as the "visual similarity score", which can be a floating-point or integer number which represents how similar an image 1415 is to the set of reference and/or training image or images on which the image analysis inspection tool was configured. The visual similarity score may be measured through a variety of methods. One basic method may be a mathematical algorithm which analyzes the average color value of the pixels of the image 1415 and compares this to the average pixel value of the training and/or reference image or images to determine the score. Another more advanced method may utilize a statistical model to generate a probability that the image 1415 is a member of the distribution of reference and/or training images on which the image analysis inspection tool has been configured, where this probability or a linearly scaled representation of the probability, may then be used as the visual similarity score. The visual similarity score may be used as an input to the inspection tool 1440, but it may also be used in other areas within the vision processing pipeline, such as a software-based trigger module as described below.

The image analysis inspection tools 1440 implement a standardized application programming interface (API) for receiving commands and input data, such as AOIs 1430, from the vision processing pipeline 1420, and returning quality assurance metrics and results including overlays 1445. The image analysis inspection tools 1440 can each run in their own host process or thread on the camera system edge computer and the API utilizes inter-process communication methods to be able to transfer the commands and data between the vision processing pipeline 1420 and the image analysis inspection tools 1440. Inter-process communication methods include but are not limited to shared memory, pipes, sockets (TCP, UDP or UNIX), kernel data structures such as message and event queues, and/or files. Any image analysis inspection tools 1440 which conforms to and implements the specified API which the vision processing pipeline 1420 expects, utilizing the specified inter-process communication mechanism, can be used to analyze the corresponding AOI of the raw image 1415 and return quality assurance metrics including overlays 1445. Further, the tools can be fully containerized, in which the tool implementation, referred to herein as software code, runtime requirements and dependencies, and associated metadata for the image analysis inspection tools 1440 are developed and downloaded or otherwise loaded onto the camera system fully independently from the remainder of the vision processing pipeline 1420.

Containerization of the tool implementation can utilize technologies such as docker, lxc, or other linux containers to package the software code and dependencies. The associated metadata portion of the tool implementation may include a single file or set of files, where the file may be any format but may specifically be a compressed or uncompressed archive format such as .zip, .tar or .7z. When the vision processing pipeline 1420 is commanded to begin inspecting raw images 1415, it first checks the inspection routine configuration 1435 to determine which tool implementations are required for the image analysis inspection tools 1440 specified. If the tool implementations are present on the camera system, as determined by querying a local data store, then the vision processing pipeline begins a new process or thread for each image analysis inspection tools 1440, where the new process or thread runs, as defined in the tool implementation, the software code, utilizes the runtime requirements or dependencies, and may reference and utilize the associated metadata file or files. If the tool implementations are not present on the camera system, the vision processing pipeline 1420 can choose to download them from a cloud server if possible, else the vision processing pipeline can return an error and indicate as such to the user. The user interface for the camera system additionally allows a user to download or otherwise load the tool implementation for a given tool which they have configured onto a camera system on which they would like to run the tool. Through this system, it is possible to allow developers (e.g. software engineers, end users, etc.) to create and distribute tools for use in the vision processing pipeline 1420 without those application developers needing to also be developers of the vision processing pipeline 1420, employees of the company or team which develops the vision processing pipeline 1420, or otherwise associated at all with any entity which maintains, develops or implements the vision processing pipeline 1420. As long as the image analysis inspection tools 1440 are containerized as specified and implement the expected API via the IPC mechanisms, they may be fully used and utilized in the vision processing pipeline 1420.

Additional examples of quality inspection tools 1440 can include: a machine learning model which uses convolutional neural network (CNN) techniques to provide anomaly detection analysis based on images which the user has labeled (referred to herein as Tool A), a machine learning model which uses CNN techniques to provide pass-fail analysis based on images which the user has labeled (referred to herein as Tool B), a machine learning model which uses CNN techniques to provide class presence/absence determinations based images which a user has labeled and then compare the detected classes to those that the user expects as configured in 1435 in order to create a pass/fail determination (referred to herein as Tool C), a machine-learning or computer-vision based optical character recognition (OCR) which is configured to detect text in in image and compare the scanned text to that which the user has specified in the inspection routine configuration 1435 to be expected (referred to herein as Tool D); a machine-learning or computer-vision based barcode detection algorithm which is configured to scan barcodes, QR codes, data matrices, or any form of 2-D code and compare the code scanned to that which a user has specified in the inspection routine configuration 1435 to be expected (referred to herein as Tool E); a computer-vision based algorithm which has been configured to check for the presence or absence of pixels of a particular color that passes or fails depending on the expected volume as specified by the user in the inspection routine configuration 1435 (referred to herein as Tool F).

Tool A, in addition to being able to identify anomalies, can indicate the location of the anomalies in the raw image without being trained on pixel-level labels. Pixel-level labels are time consuming to produce as a user must manually mark the pixels in which the defects occur for every image in the dataset. As opposed to most CNN-based approaches that use an encoder architecture that transforms a 2D input image into a 1D embedding, a fully convolutional network can be utilized. A fully convolutional network (sometimes referred to as FCN) is a neural network as used herein can be primarily composed of convolutional layers and no linear layers. This fully convolutional network maintains the natural 2D structure of an image with the output embedding of the network such that when distance comparisons between embeddings and a learned centroid embedding are calculated, the larger elements of the 2D distance array indicate the region in the raw image of the defect. In addition to this architecture, a contrastive loss function can be utilized that allows for training the network on only nominal data, while also leveraging anomalous data when it is available. The contrastive loss function trains the network in a manner where the network is encouraged to place nominal samples near the learned centroid embedding and anomalous samples far away. By using these approaches, an overlay image can be produced that indicates an anomaly score for each pixel in the raw image.

Tools B and C can utilize transfer learning and self-supervised learning where a CNN model trained on a separate task is adapted to the task at hand. This allows one to use much less data than if the model has been trained from scratch. Given this pretrained model, earlier layers can be reused and additional linear layers that are designed for the new task can be appended. In order to produce overlay visualizations, the regions in the raw image that contributed most to the prediction of the model can be identified.

For tools D and E, the overlay can indicate the region of the image that the text or barcode was found can be indicated using a bounding box.

Tool F can produce an overlay visualization based on the regions of the raw image that match the configured color range.

Figure 15:
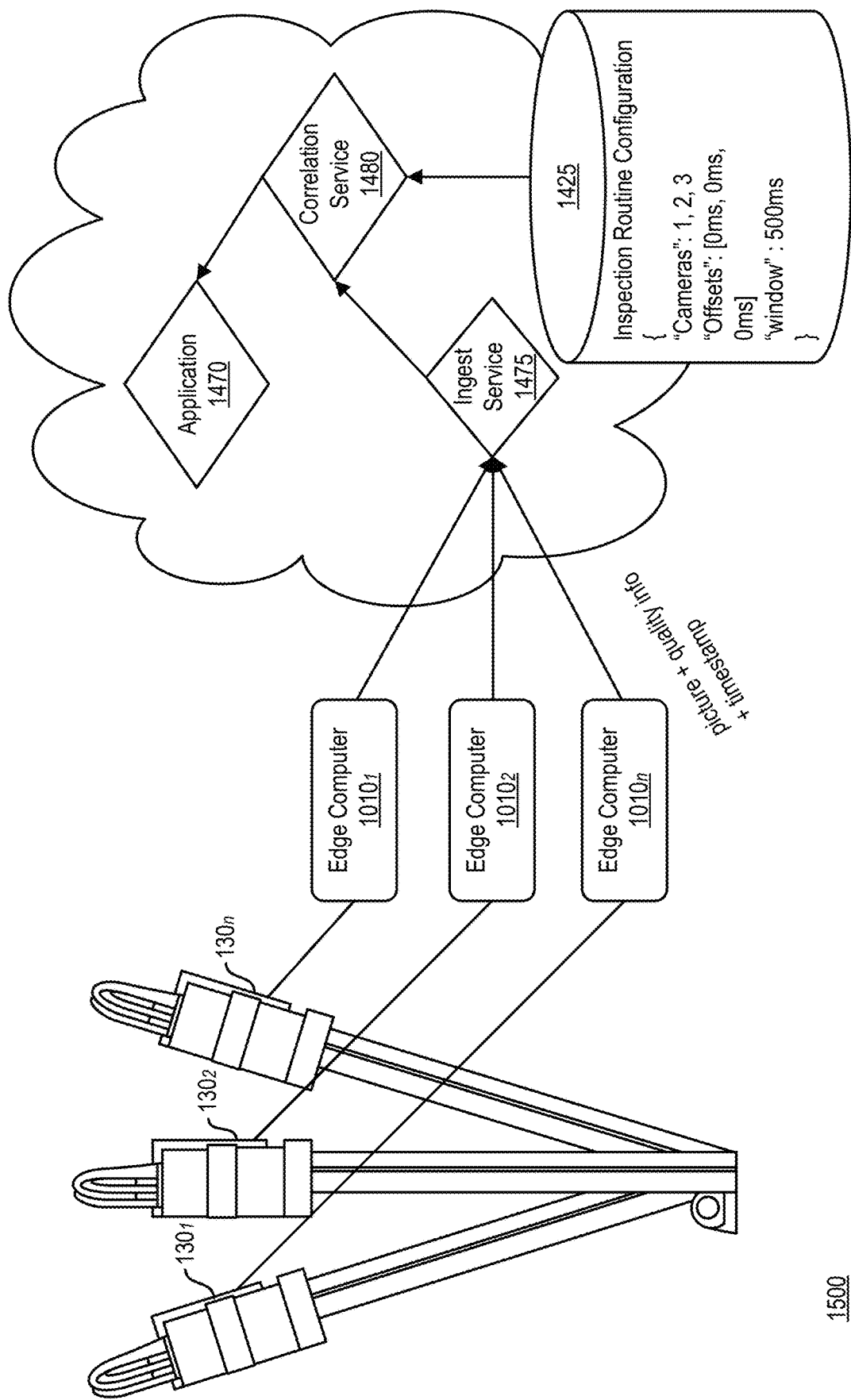
FIG. 15 is a diagram illustrating cloud-based processing of images generated by a production line system having two or more inspection camera modules connected to multiple edge computers.

FIG. 15 is a diagram 1500 illustrating various operations/applications that can be performed in the cloud after publication of the image and associated information as described above. An ingestion service 1475 can receive the published images 1465 from the vision processing pipeline 1425 over one or more communication networks (e.g., the Internet, etc.). The ingestion service 1475 can act as the interface for the cloud application 1470. An intermediate correlation service 1480 can take the ingested images and correlate them according to various factors including synchronized timestamps and/or other user settings (e.g., user-specified rules and attributes, etc.) which can form part of the inspection routine configuration 1425.

The user settings in the inspection routine configuration 1425 can specify which of the results (i.e., published images including complementary information) from which image camera modules $130_{1 \ldots n}$ from are to be correlated. The inspection routine configuration 1425 can specify time-based offsets among or between image camera modules $130_{1 \ldots n}$. These offsets can correspond to or otherwise take into account any expected differences in times among images generated by the image camera modules $130_{1 \ldots n}$ based on their physical positioning relative to each other (and the speed of the conveyance mechanism, etc.). If all of the image camera modules $130_{1 \ldots n}$ share a trigger, the offset value would be zero (or alternatively the user settings do not include any offsets). If it is known that a first image camera module $130_1$ is roughly 500 ms down the production line from a second image camera module $130_2$ then the offset would be set to 500 ms.

The correlation service 1480 can also specify a time window in which certain images (and their complementary information) are grouped together. This time window can be used to associate images (and their complementary information) which might not be precisely aligned given differences in ideal/predicted timestamps and the synchronization processes. The time window can be specified to be approximately 50% of the inter-item time on the line to allow for maximum synchronization error (clocks/timestamps not perfectly in sync) and minimum correlation error (as pictures can be grouped together incorrectly on items). The inter-item time can be calculated by taking the line rate, e.g. 200 items per minute, and dividing by 60 seconds per minute to get 3.33 items per second, and then inverting this number, i.e. 1/3.33 to get an inter-item time of 0.3 seconds. One default for the correlation window can be 150 ms for a line rate of 200 items per minute. A simple implementation of the correlation algorithm can then be defined as follows: image_i should be correlated with existing correlated images {image_1, . . . , image_N} if: abs(timestamp_i−avg(adjusted_timestamps_ij))=<window_i, where avg(adjusted_timestamps_ij)=$\Sigma_{j=1}^{N}$ (timestamp$_j$+offset$_{ij}$)/N. This algorithm can be modified to ensure no more than 1 image from a given camera is correlated on the same item.

Figure 16:
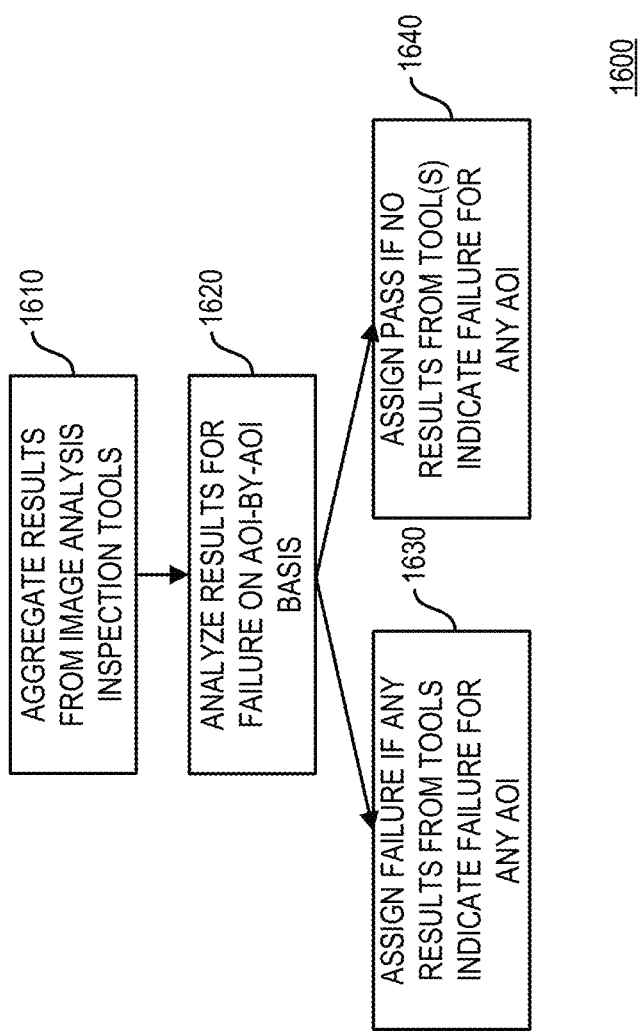
FIG. 16 is a first process flow diagram for assigning an object with a pass or fail designation.
Figure 17:
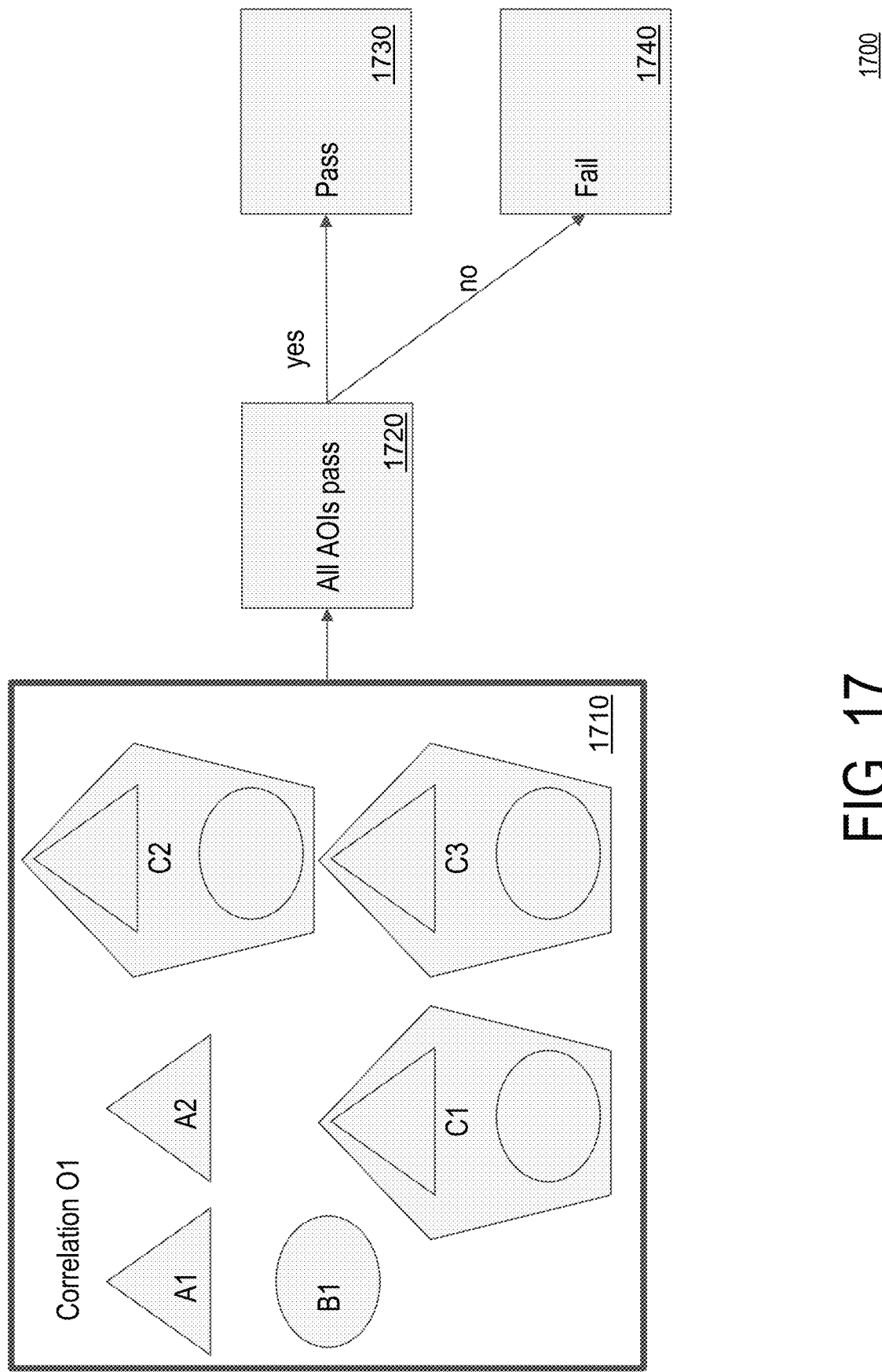
FIG. 17 is a first diagram illustrating a pass/fail designation for an object/product.

FIG. 16 is a process flow diagram 1600 which provides operations for determining the overall quality inspection result for an object. These operations can aggregate, at 1610, results from the various image analysis inspection tool(s). The results can be analyzed, at 1620, on an AOI-by-AOI basis such that, at 1630, the object is deemed to fail its inspection if any of the results for a particular AOI indicate a failure. In addition, at 1640, the object is deemed to pass its inspection if none of the results for the AOIs indicate a failure. Further, if the results are inconclusive, rules can specify either that the object passed or failed the inspection depending on the particular application. This arrangement is further illustrated in diagram 1700 of FIG. 17 in which correlated results (1710) can be analyzed on an AOI-by-AOI basis (1720) such that if the objects will be deemed to pass (1730) if the inspection results for all AOIs are deemed to meet the relevant thresholds and, conversely, the object is deemed to fail (1740) if any of the inspections do not meet the relevant threshold.

Figure 18:
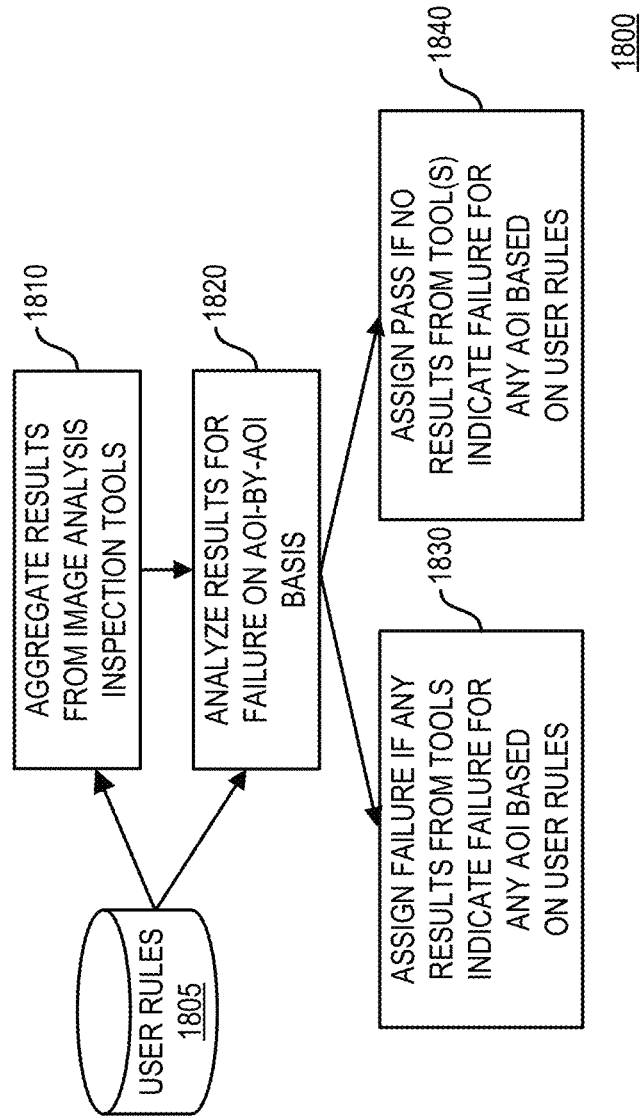
FIG. 18 is a second process flow diagram for assigning an object with a pass or fail designation.
Figure 19:
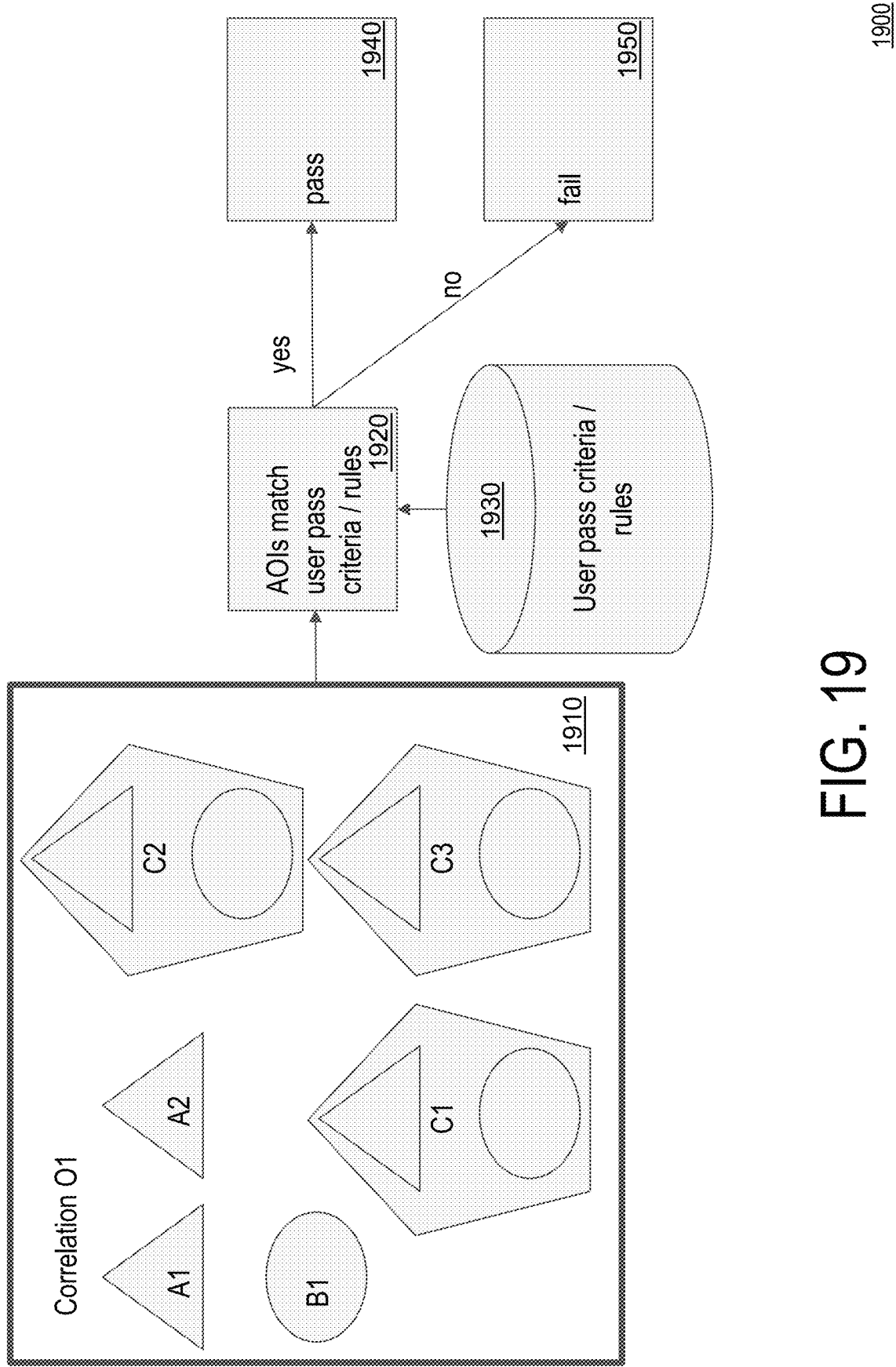
FIG. 19 is a second diagram illustrating a pass/fail designation for an object/product.

FIG. 18 is a process flow diagram 1800 which provides operations for determining the overall quality inspection result for an object which utilizes user rules 1805. These operations can aggregate, at 1810, results from the various image analysis inspection tool(s). The aggregation service (performing the aggregation) can use predefined user rules 1805 when determining which results to aggregate or otherwise analyze together. The results can be analyzed, at 1820, on an AOI-by-AOI basis such that, at 1830, the object is deemed to fail its inspection if any of the user rules defining a failure condition are triggered. In addition, at 1840, the object is deemed to pass its inspection if none of the results for the AOIs indicate a failure as indicated by the user rules. This arrangement is further illustrated in diagram 1900 of FIG. 19 in which correlated results (1910) can be analyzed on an AOI-by-AOI basis (1920) such that if the objects will be deemed to pass (1940) if the inspection results for all AOIs are deemed to pass according to a set of rules (1930) and, conversely, the object is deemed to fail (1950) if any of the inspections fail as specified in the rules.

For example, a user rule can specify that if any AOI on image inspection module is assigned fail, then the object is deemed to have failed the inspection. With some rules, failure associated with a specific failure can cause the object to be deemed to have failed the inspection. With some rules, a certain number of AOIs need to have an associated failure for the object to be deemed to have failed the inspection. As another example, the rules can specify that if a certain of the image analysis inspection tools fails (e.g., barcode reader, etc.), then the object can be deemed to have failed the inspection. As another example, the rules can specify such that if at least one of the image analysis inspection tools is a pass, then the object is a pass. This can be useful, for example, when looking at multiple camera angles for a single barcode where the placement is inconsistent overall but consistent in that it will be detected in at least one of the camera angles.

Figure 20:
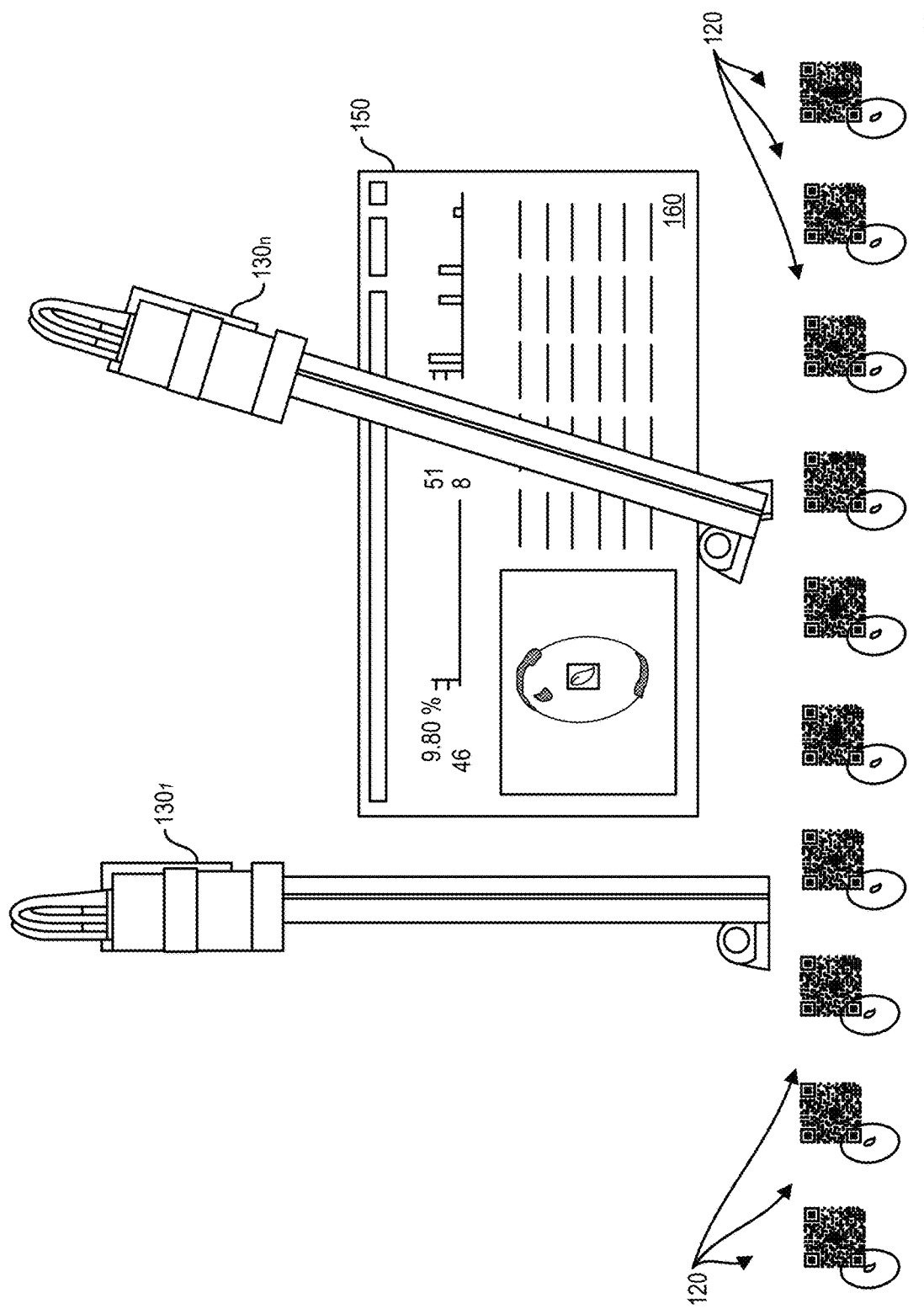
FIG. 20 is a diagram illustrating a production line system providing object anomaly visualizations with two or more inspection camera modules in which each object has a unique visual identifier.

FIG. 20 is a diagram 2000 illustrating a variation in which there are two or more spatially distant inspection camera modules $130_{1 \ldots n}$ along the inspection line. Here, the objects 120 can have a visual unique identifier (e.g., a barcode, QR code, alphanumeric string, etc.) which can be detected by the image analysis inspection tools $1340_{1 \ldots n}$. With this variation, the image analysis inspection tools $1340_{1 \ldots n}$ can be configured in the inspection routine configuration 1425 (barcode scan, QR code scan, text scan), such that a unique identifier can be returned with the corresponding generated tool metadata along with all of their other results (pass/fail, complementary data, etc.). This unique identifier can be used in place of or in addition to the synchronized timestamps when performing the cloud-based correlation by the correlation service 1480. This arrangement is generally more robust and flexible than timestamps alone as it can handle inspection line stoppages when inspection camera modules are not sharing a trigger. For example, images from a grouping of multiple cameras at one point on the line can be correlated with timestamps, as can images from a separate such grouping at another point on the line. If the item has a barcode, and just a single camera in both groupings can capture this barcode, the images from both groupings can then all be correlated using the barcode as a unique identifier.

Figure 21:
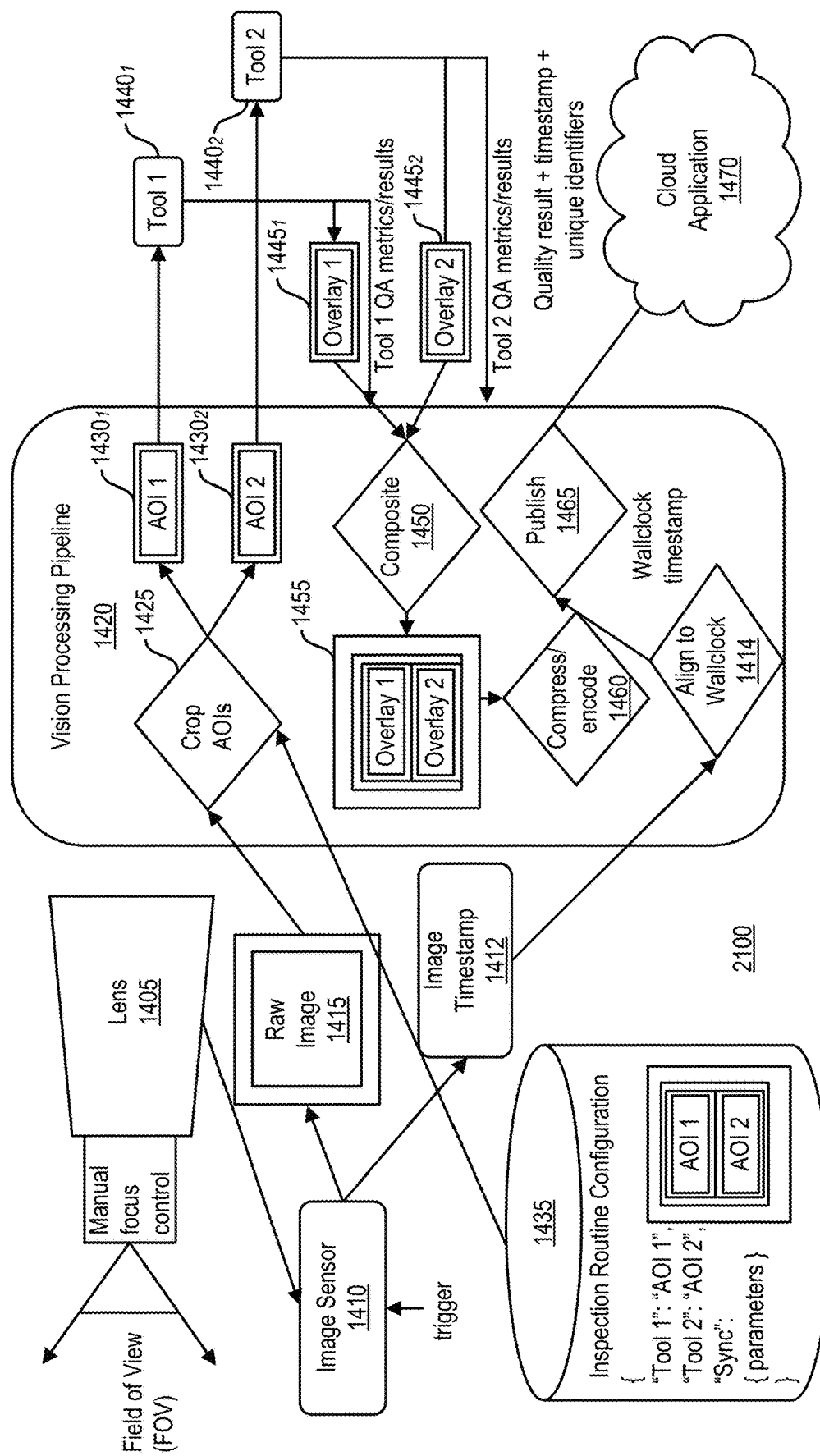
FIG. 21 is a diagram illustrating an image processing workflow using a cloud application in which both unique identifiers and timestamps are utilized.

FIG. 21 is a diagram 2100 that illustrates another workflow utilized by a vision processing pipeline. FIG. 21 is similar to that of FIG. 14 with the exception of the published images including not only the results of the image analysis inspection tools $1340_{1 \ldots n}$ but also the unique identifiers detected on the objects 120 for ultimate consumption by the cloud application 1470 and use by the correlation service 1480. In some cases, the published images can also include timestamps for ultimate consumption by the cloud application 1470 and use by the correlation service 1480.

Figure 22:
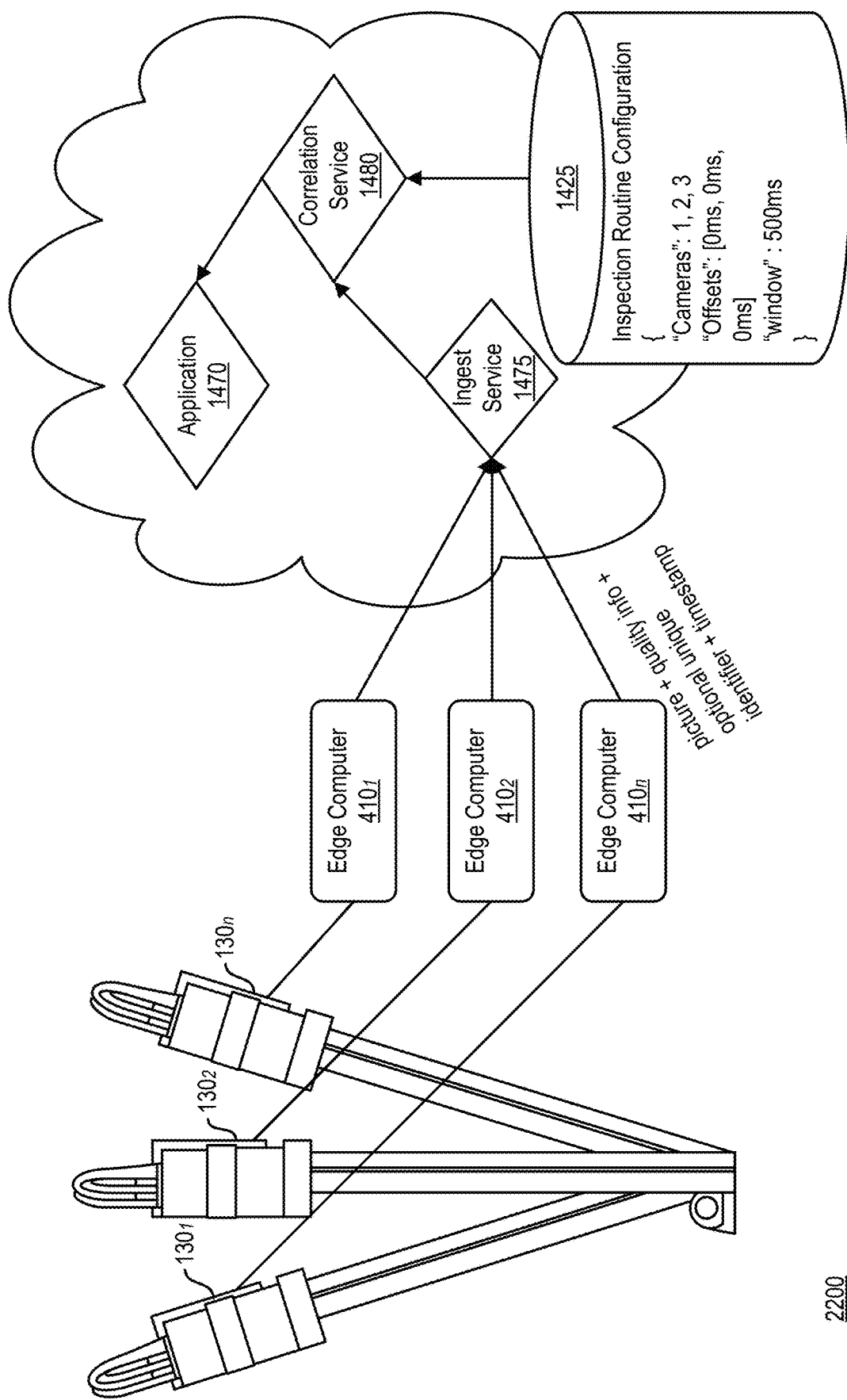
FIG. 22 is a diagram illustrating cloud-based processing of images generated by a production line system having two or more inspection camera modules connected to multiple edge computers in which timestamps and unique identifiers can be used in tandem.

FIG. 22 is a further diagram 2200 illustrating various operations/applications that can be performed in the cloud after publication of the image and associated information as described above. Similar to that of FIG. 15, the arrangement in FIG. 22 differs in that the ingestion service 1475 consumes the picture, tool results (e.g., quality information, etc.), detected or otherwise received unique identifiers, and image timestamps for use in the correlation service 1480.

Figure 23:
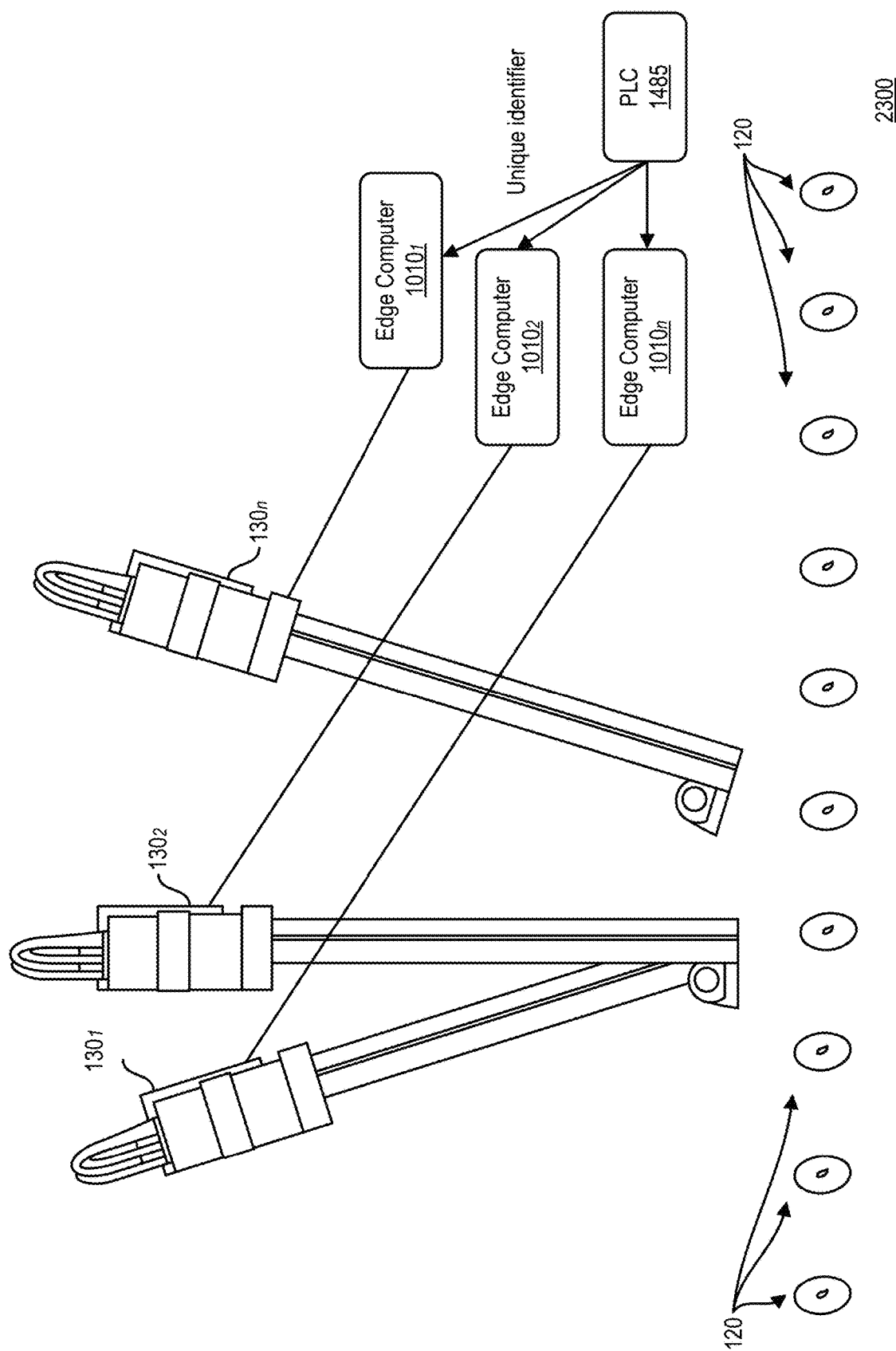
FIG. 23 is a diagram illustrating a production line system providing object anomaly visualizations with two or more inspection camera modules in which each object is assigned a unique identifier by a PLC.

FIG. 23 is a diagram 2300 illustrating a variation in which there are two or more spatially distant inspection camera modules $130_{1...n}$ along the inspection line in which a programmable logic controller (PLC) 1385 can provide a unique identifier for each object passing in front of the inspection camera modules $130_{1...n}$. This unique identifier can be used as an alternative to or in combination with the unique identifiers (i.e., bar codes, QR codes, alphanumeric strings, etc.) and/or timestamps in other variations. This unique identifier (generated by the PLC 1485) can be recorded and published by the vision processing pipeline 1425 for ultimate use by the correlation service 1480.

Figure 24:
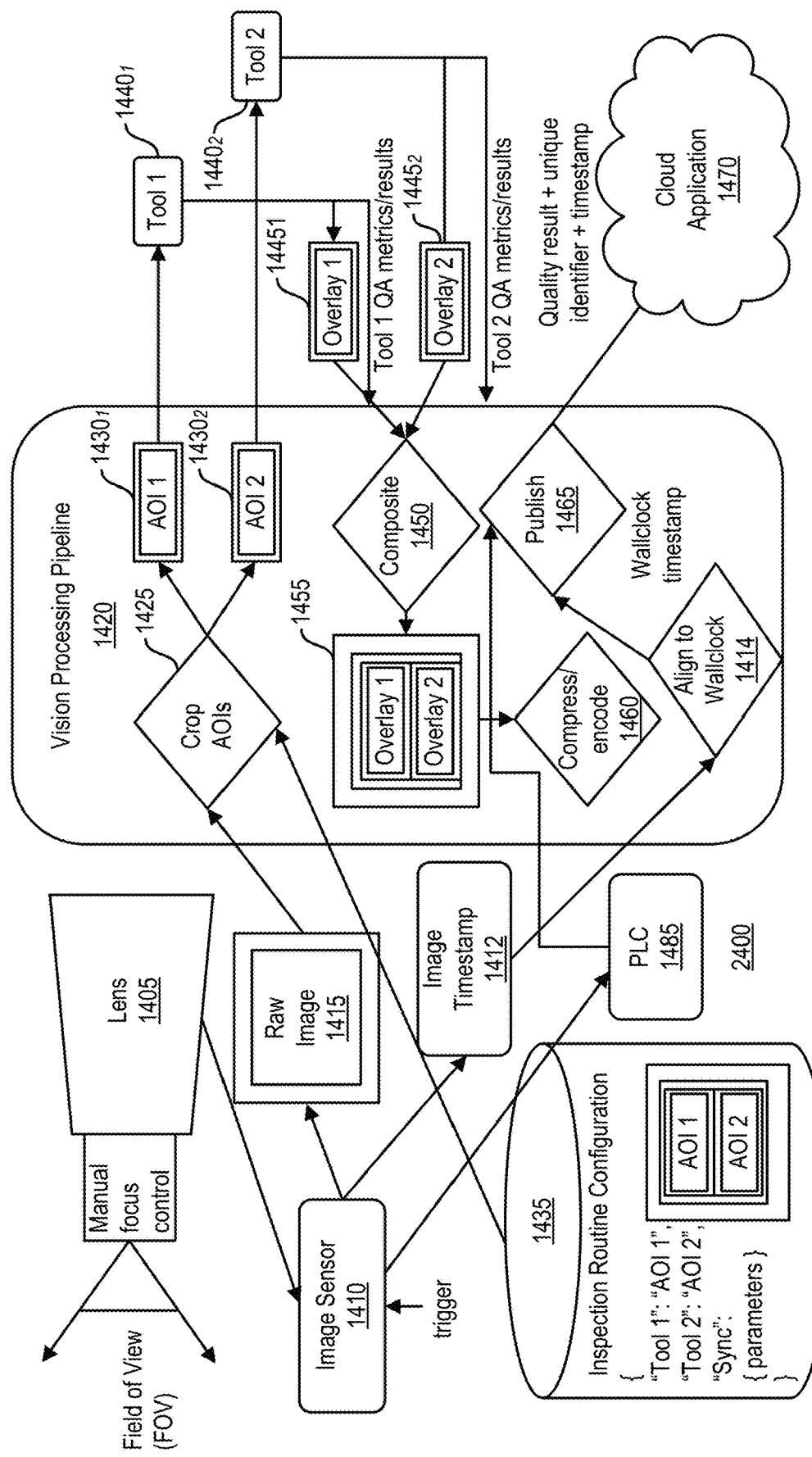
FIG. 24 is a diagram illustrating an image processing workflow using a PLC.

FIG. 24 is a diagram 2400 illustrating a workflow utilized by a vision processing pipeline in which the PLC 1485 can provide the measured/calculated unique identifiers to the published image 1465.

Figure 25:
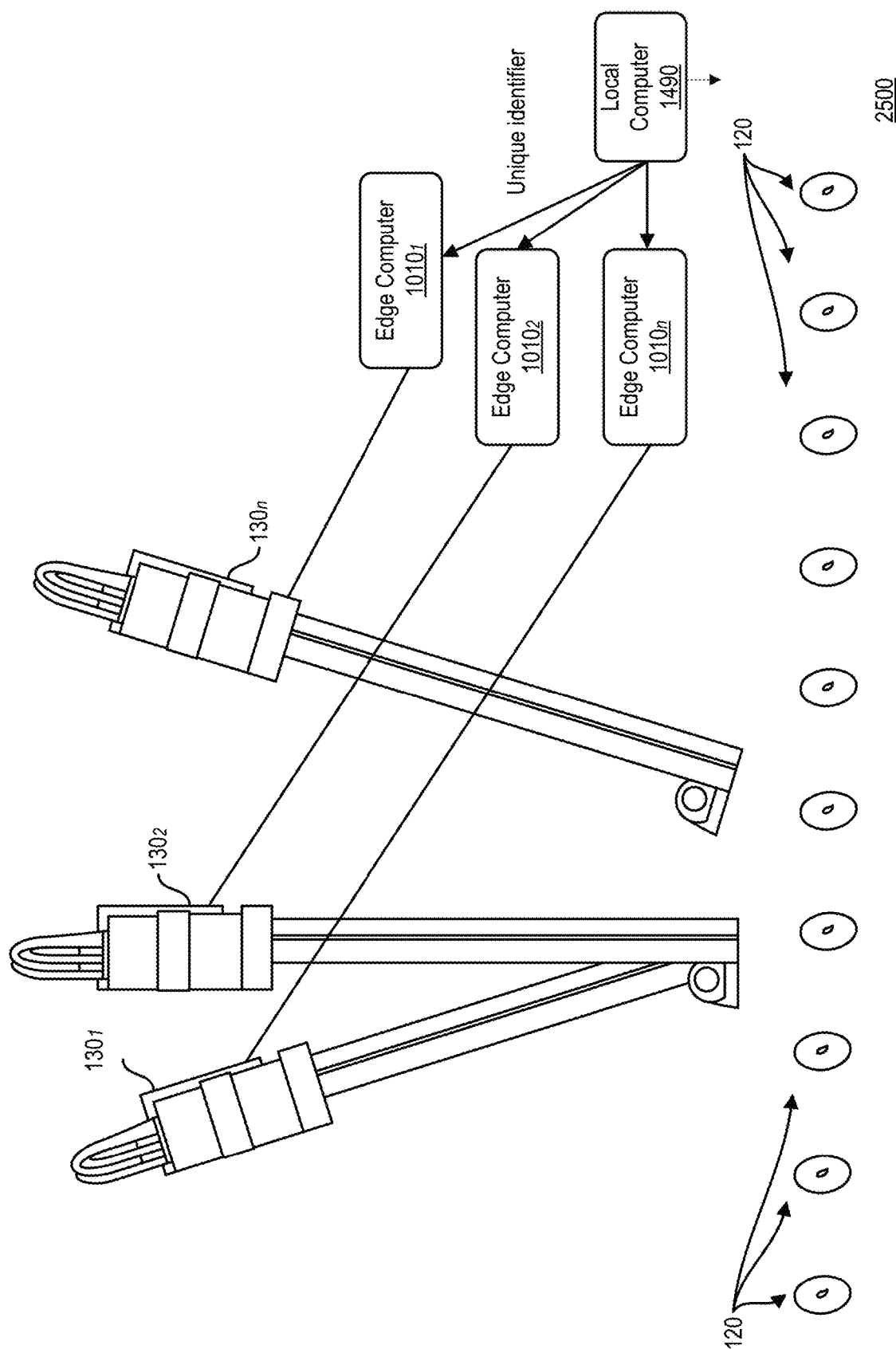
FIG. 25 is a diagram illustrating a production line system providing object anomaly visualizations with two or more inspection camera modules in which correlation is performed by a local computer.

FIG. 25 is a diagram 2500 illustrating an alternative to the previously described approaches in which the cloud application 1470 ultimately utilizes the published image 1465 after ingestion. Here, a local computer 1490 (which can be on a network) can execute an application to utilize the published images 1465. In some variations, the local computer 1490 is one of the edge computers 1010. Such an arrangement may be preferred for applications in which security dictates local computing resources and/or when the corresponding image analysis inspection tools are computationally lightweight in nature.

Figure 26:
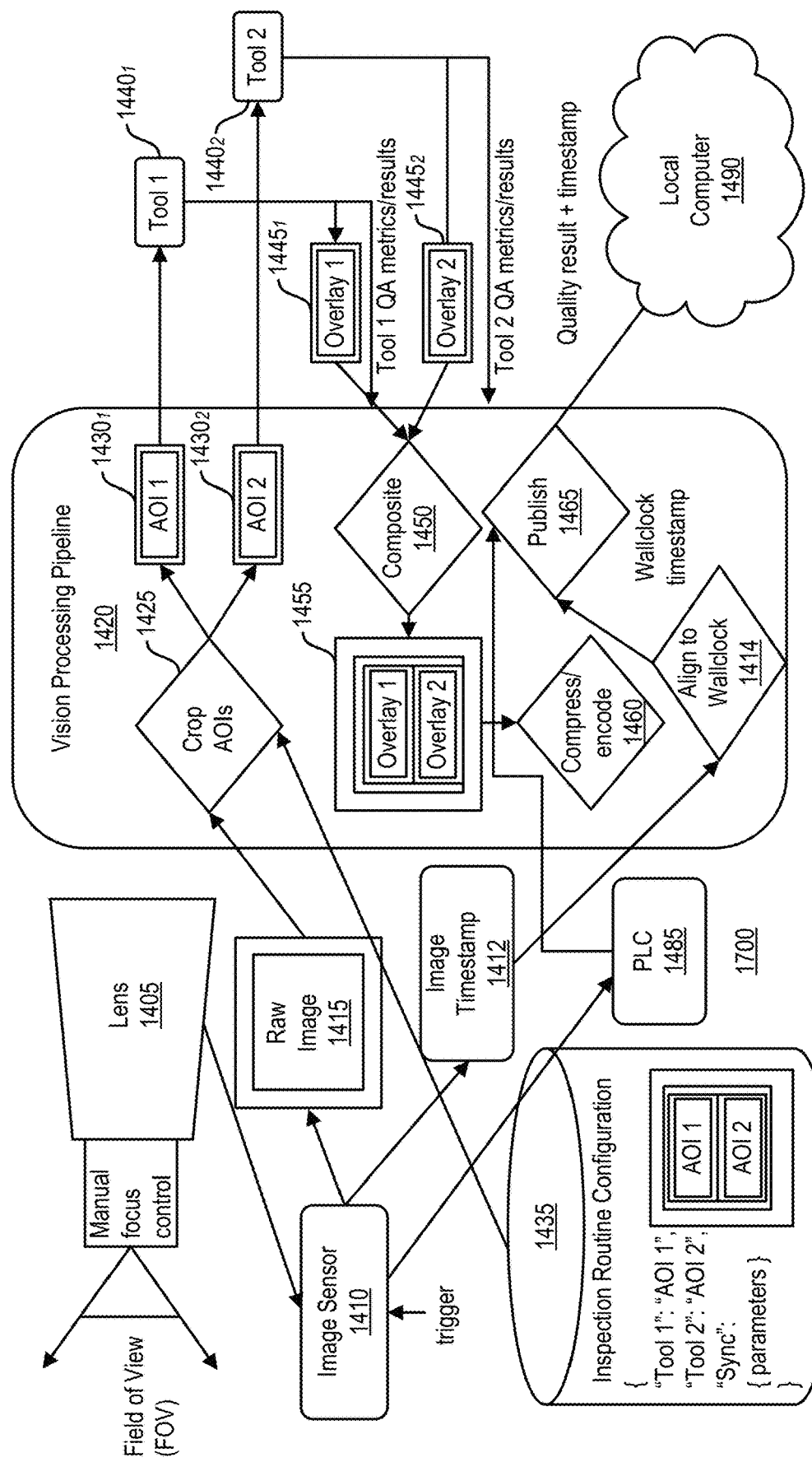
FIG. 26 is a diagram illustrating an image processing workflow using a local application.

FIG. 26 is a diagram 2600 illustrating a workflow utilized by a vision processing pipeline in which the local computer 1490 can receive the quality result and timestamps and/or unique identifiers.

Figure 27:
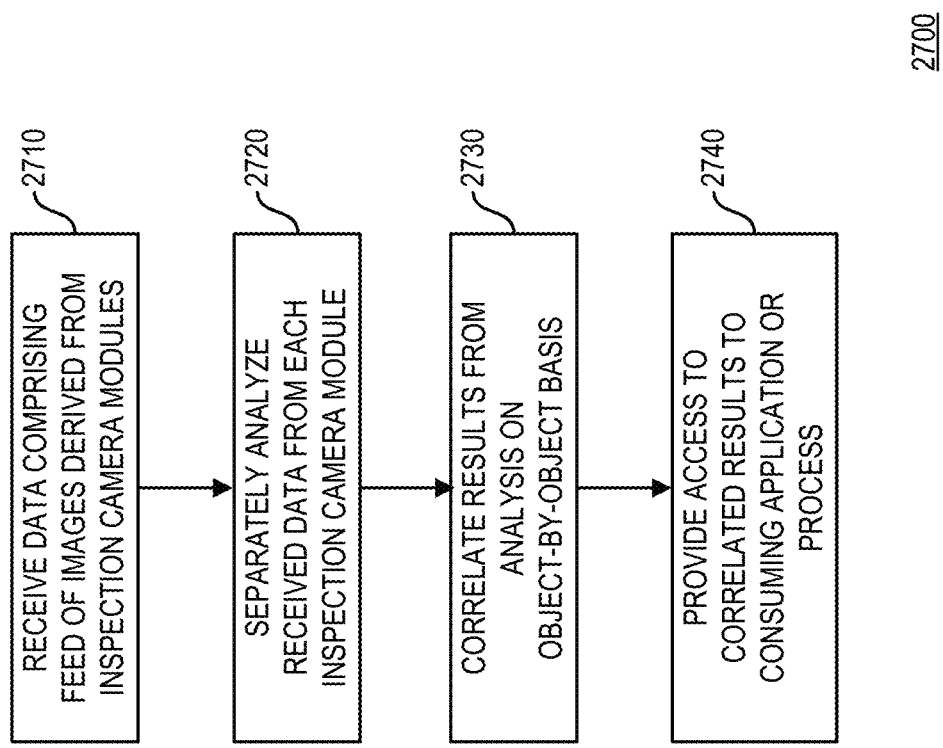
FIG. 27 is a process flow diagram for providing multi-camera based quality assurance.

FIG. 27 is a process flow diagram 2700 in which, at 2710, data is received that is derived from each of a plurality of inspection camera modules forming part of a quality assurance inspection system. The data includes a feed of images of a plurality of objects passing in front of the respective inspection camera module. Thereafter, at 2720, the received data is separately analyzed by each inspection camera module using at least one image analysis inspection tool. The results of the analyzing can be correlated, at 2730 for each inspection camera module on an object-by-object basis. The correlating can use timestamps for the images and/or detected unique identifiers within the images and can be performed by a cloud-based server and/or a local edge computer. Access to the correlated results can be provided, at 2740, to a consuming application or process.

Figure 28:
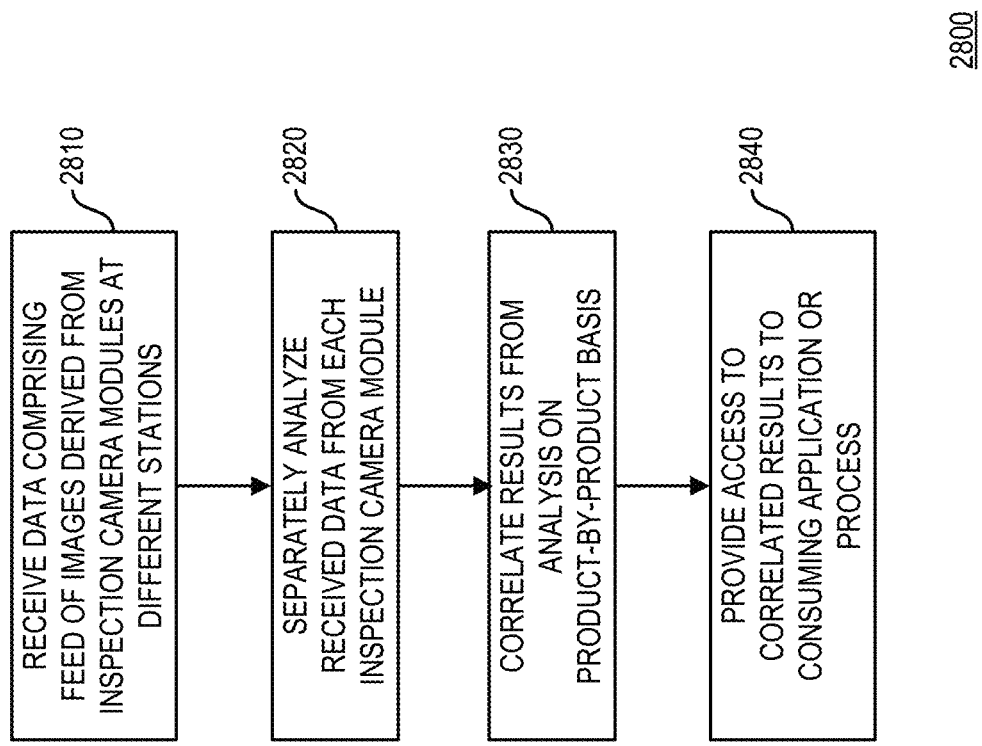
FIG. 28 is process flow diagram for providing multi-camera based quality assurance over a manufacturing lifecycle.

FIG. 28 is a diagram 2800 in which, at 2810, data is received that includes a feed of images of a plurality of objects passing in front of each of a plurality of inspection camera modules forming part of each of a plurality of stations. The stations can together form part of a quality assurance inspection system. The objects when combined or assembled, can form a product. The received data derived from each inspection camera module can be separately analyzed, at 2820, using at least one image analysis inspection tool. The analyzing can include visually detecting a unique identifier for each object. The images are transmitted, at 2830, with results from the inspection camera modules along with the unique identifiers to a cloud-based server to correlate results from the analyzing for each inspection camera module on an product-by-product basis. Access to the correlated results can be provided, at 2840, to a consuming application or process via the cloud-based server.

Figure 29:
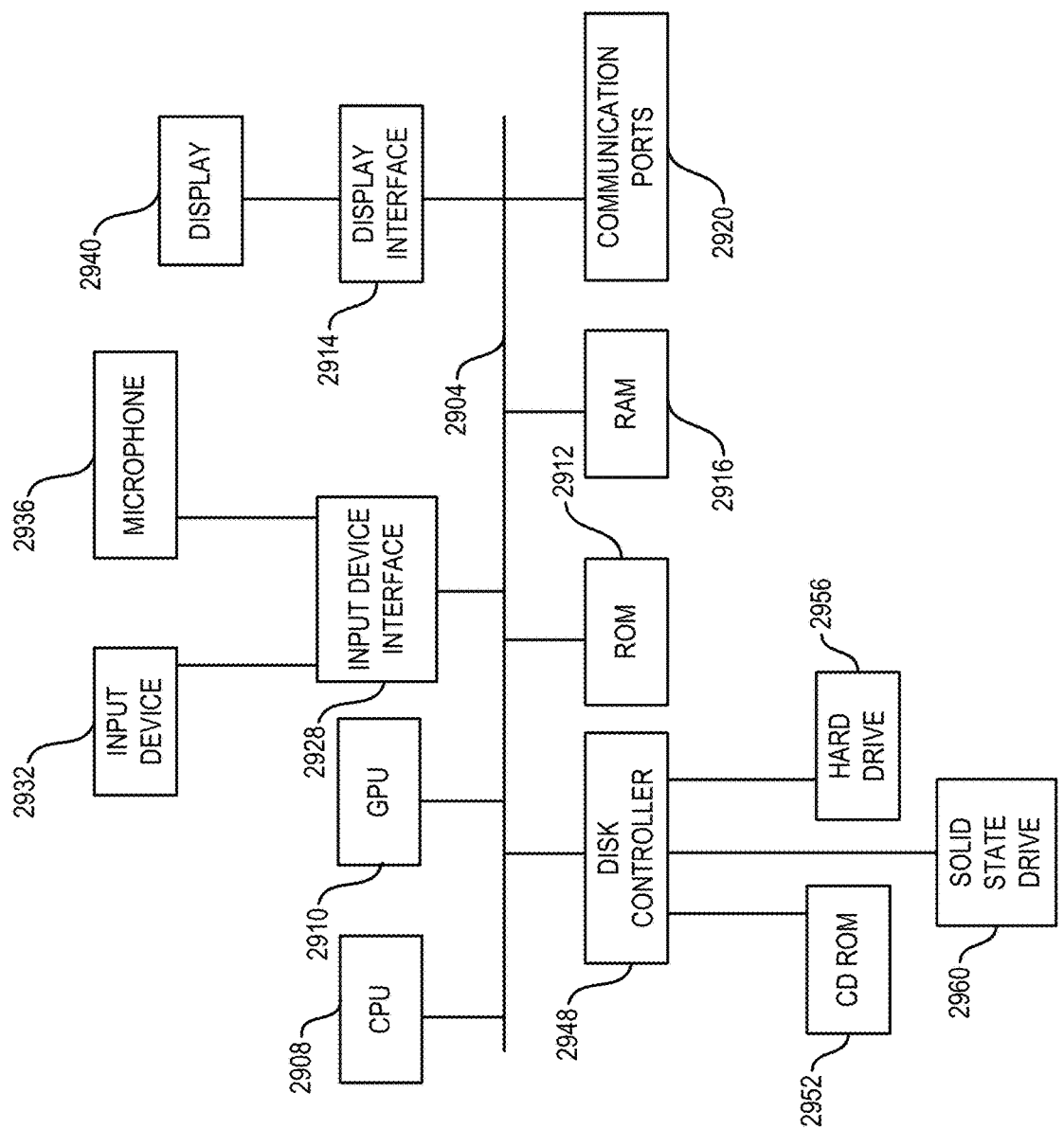
FIG. 29 is a diagram illustrating a computing device for implementing aspects of the current subject matter.

FIG. 29 is a diagram 2900 illustrating a sample computing device architecture for implementing various aspects described herein in which certain components can be omitted depending on the application. A bus 2904 can serve as the information highway interconnecting the other illustrated components of the hardware. A processing system 2908 labeled CPU (central processing unit) (e.g., one or more computer processors/data processors at a given computer or at multiple computers) and/or a GPU-based processing system 2910 can perform calculations and logic operations required to execute a program. A non-transitory processor-readable storage medium, such as read only memory (ROM) 2912 and random access memory (RAM) 2916, can be in communication with the processing system 2908 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 2948 can interface with one or more optional disk drives to the system bus 2904. These disk drives can be external or internal floppy disk drives such as 2960, external or internal CD-ROM, CD-R, CD-RW or DVD, or solid state drives such as 2952, or external or internal hard drives 2956. As indicated previously, these various disk drives 2952, 2956, 2960 and disk controllers are optional devices. The system bus 2904 can also include at least one communication port 2920 to allow for communication with external devices either physically connected to the computing system or available externally through a wired or wireless network. In some cases, the at least one communication port 2920 includes or otherwise comprises a network interface.

To provide for interaction with a user, the subject matter described herein can be implemented on a computing device having a display device 2940 (e.g., a CRT (cathode ray tube) or LCD (liquid crystal display) monitor) for displaying information obtained from the bus 2904 via a display interface 2914 to the user and an input device 2932 such as keyboard and/or a pointing device (e.g., a mouse or a trackball) and/or a touchscreen by which the user can provide input to the computer. Other kinds of input devices 2932 can be used to provide for interaction with a user as well; for example, feedback provided to the user can be any form of sensory feedback (e.g., visual feedback, auditory feedback by way of a microphone 2936, or tactile feedback); and input from the user can be received in any form, including acoustic, speech, or tactile input. The input device 2932 and the microphone 2936 can be coupled to and convey information via the bus 2904 by way of an input device interface 2928. Other computing devices, such as dedicated servers, can omit one or more of the display 2940 and display interface 2914, the input device 2932, the microphone 2936, and input device interface 2928.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for providing quality assurance comprising:
   receiving data comprising a feed of images of a plurality of objects passing in front of the each of a plurality of inspection camera modules forming part of a quality assurance inspection system, each image having a corresponding timestamp, two or more of the inspection camera modules having a non-synchronized clock relative to the other inspection camera modules;
   synchronizing the timestamps generated by the plurality of inspection camera modules;
   separately analyzing the received data from each inspection camera module using at least one of a plurality of image analysis inspection tools, wherein a least a portion of the image analysis inspection tools comprises a machine learning model uniquely trained for a particular one of the plurality of inspection camera modules;
   correlating results from the analyzing for each inspection camera module on an object-by-object basis using the synchronized timestamps; and
   providing access to the correlated results to a consuming application or process.

2. The method of claim 1 further comprising: causing the correlated results to be stored in a remote cloud-based database.

3. The method of claim 1 further comprising: causing the correlated results to be stored in a local database.

4. The method of claim 1, wherein the objects are moved in front of the inspection camera modules via a conveyance mechanism.

5. The method of claim 1, wherein the inspection camera modules utilize a same type of trigger to capture the respective feed of images.

6. The method of claim 1, wherein at least two of the inspection camera modules utilize a different type of trigger to capture the respective feed of images.

7. The method of claim 6, wherein the type of triggers comprise:
   hardware triggers and software triggers.

8. The method of claim 7, wherein the software triggers utilize machine learning to determine when to capture an image for the feed of images.

9. The method of claim 1 further comprising:
   generating, based on the correlated results, an inspection result for each object characterizing whether such objects are defective or aberrant.

10. The method of claim 9, wherein the generating uses a set of rules to determine that the object is defective or aberrant based on inspections of varying areas of interest (AOI) in the images.

11. The method of claim 10, wherein at least two of the AOIs for an image are analyzed by different image analysis inspection tools.

12. The method of claim 1, wherein at least one of the inspection camera modules is at a different location relative to the other inspection camera modules such that a field of view of the inspection camera module at the different location does not overlap a field of view of any of the other inspection camera modules.

13. The method of claim 1, wherein a field of view of each inspection camera module overlaps a field of view of at least one of the other inspection camera modules.

14. The method of claim 1, wherein each of the inspection camera modules are connected to a single computing device having a clock, and wherein the synchronizing comprises:
assigning a timestamp to each image using the clock;
wherein the correlating uses the assigned timestamps to associate images for a particular object.

15. The method of claim 1, wherein the synchronizing comprises:
synchronizing the clocks of the different computing devices; and
assigning a timestamp to each image using the corresponding clock for the computing device to which the respective inspection camera module is connected;
wherein the correlating uses the timestamps to associate images for a particular object.

16. The method of claim 15, wherein the clocks are synchronized using a local timeserver.

17. The method of claim 15, wherein the clocks are synchronized using a remote, Internet-based timeserver.

18. The method of claim 1 further comprising:
assigning a counter value to each image;
wherein the correlating uses the assigned counter values to associate images for a particular object.

19. The method of claim 1 further comprising:
applying a timing offset to timestamps for images generated by one of the inspection camera modules based on a distance of such inspection camera modules relative to the other inspection camera modules;
wherein the correlating uses the timestamps after application of the timing offset to associate images for a particular object.

20. The method of claim 1 further comprising:
detecting, by one or more of the image analysis inspection tools, a unique identifier for each object;
wherein the correlating uses the detected unique identifiers to associate images for a particular object.

21. The method of claim 20, wherein the unique identifier comprises a barcode.

22. The method of claim 20, wherein the unique identifier comprises an alphanumeric string detected by the image analysis inspection tool using optical character recognition (OCR).

23. The method of claim 1 further comprising:
receiving unique identifiers for each object generated by a production line controller (PLC) or software application;
wherein the correlating uses the received unique identifiers to associate images for a particular object.

24. The method of claim 1, wherein the correlating is performed remotely by a cloud-based server.

25. The method of claim 1, wherein the correlating is performed locally by an edge computer to which one of the image inspection modules is coupled.

26. The method of claim 1, wherein the correlating is performed via a combination of methods utilizing two or more of: timestamps, detected unique identifiers, or received unique identifiers.

27. The method of claim 1, further comprising: receiving unique identifiers for each object generated by a corresponding user application;
wherein the correlating uses the received unique identifiers to associate images for a particular object.

28. A computer-implemented method for providing quality assurance comprising:
receiving data comprising a feed of images of a plurality of objects passing in front of each of a plurality of inspection camera modules forming part of a quality assurance inspection system, each image having a corresponding timestamp;
synchronizing timestamps generated by the plurality of inspection camera modules by applying a timing offset to timestamps for images generated by one of the inspection camera modules based on a distance of such inspection camera modules relative to the other inspection camera modules;
separately analyzing the received data from each inspection camera module using at least one image analysis inspection tool, the analyzing comprising visually detecting a unique identifier for each object;
transmitting the images and timestamps with results from the inspection camera modules and the unique identifiers to a cloud-based server to correlate results from the analyzing for each inspection camera module on an object-by-object basis; and
providing access to the correlated results to a consuming application or process via the cloud-based server.

29. A computer-implemented method for providing quality assurance comprising:
receiving data comprising a feed of images of a plurality of objects passing in front of each of a plurality of inspection camera modules forming part of a quality assurance inspection system, each image having a corresponding timestamp;
synchronizing the timestamps generated by the plurality of inspection camera modules;
separately analyzing the received data from each inspection camera module using at least one machine learning-based image analysis inspection tool from amongst a plurality of machine learning-based image analysis inspection tools, at least a portion of the images being analyzed by different machine learning-based image analysis inspection tools;
transmitting the images along with results from the inspection camera modules and the timestamps to a cloud-based server to correlate results from the analyzing for each inspection camera module on an object-by-object basis; and
providing access to the correlated results to a consuming application or process.

* * * * *